US012395878B2

(12) United States Patent
Abedini et al.

(10) Patent No.: US 12,395,878 B2
(45) Date of Patent: Aug. 19, 2025

(54) ACCESS CONTROL FOR NETWORK ENERGY SAVINGS

(71) Applicant: QUALCOMM Incorporated, San Diego, CA (US)

(72) Inventors: Navid Abedini, Basking Ridge, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 475 days.

(21) Appl. No.: 17/814,711

(22) Filed: Jul. 25, 2022

(65) Prior Publication Data

US 2024/0031849 A1   Jan. 25, 2024

(51) Int. Cl.
*H04W 24/10* (2009.01)
*H04W 8/00* (2009.01)
*H04W 24/08* (2009.01)
*H04W 68/00* (2009.01)
*H04W 76/10* (2018.01)

(52) U.S. Cl.
CPC .......... *H04W 24/10* (2013.01); *H04W 8/005* (2013.01); *H04W 24/08* (2013.01); *H04W 68/005* (2013.01); *H04W 76/10* (2018.02)

(58) Field of Classification Search
CPC ..... H04W 24/10; H04W 24/08; H04W 48/16; H04W 48/20; H04W 68/005; H04W 76/10; H04W 8/005
See application file for complete search history.

(56) References Cited

U.S. PATENT DOCUMENTS

| 11,496,938 | B1* | 11/2022 | Malhotra | ............ H04L 65/1104 |
| 2013/0144551 | A1* | 6/2013 | Zhou | ....................... G06F 17/00 |
| | | | | 702/122 |
| 2021/0314833 | A1* | 10/2021 | Hao | ....................... H04W 36/34 |
| 2021/0400620 | A1* | 12/2021 | Tao | ....................... H04W 24/10 |
| 2022/0338077 | A1* | 10/2022 | Kim | ..................... H04W 36/362 |

* cited by examiner

*Primary Examiner* — Ji-Hae Yea
(74) *Attorney, Agent, or Firm* — Kevin M. Donnelly; Harrity & Harrity, LLP

(57) ABSTRACT

Various aspects of the present disclosure generally relate to wireless communication. In some aspects, a user equipment (UE) may monitor a control channel of a first cell associated with a first network node based at least in part on the first cell operating in a first operating mode. The UE may transmit, to the first network node or a second network node, a first signal associated with establishing a connection with the first cell or with a second cell, associated with the first network node or the second network node, the second cell operating in a second operating mode, the first signal being transmitted based at least in part on at least one of: a paging signal associated with the first cell, or one or more measurements associated with the second cell. Numerous other aspects are provided.

30 Claims, 13 Drawing Sheets

ACCESS CONTROL FOR NETWORK ENERGY SAVINGS

FIELD OF THE DISCLOSURE

Aspects of the present disclosure generally relate to wireless communication and specifically, to techniques and apparatuses associated with access control for network energy savings.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different UEs to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

High power consumption by a wireless communication system (for example, by one or more network nodes) is a significant operational and environmental issue. It may be beneficial to reduce an amount of power consumed by cells within the wireless communication system. However, it may difficult to balance between a cell of the wireless communication system transmitting signals (such as system information blocks (SIBs) or synchronization signal blocks (SSBs)) more frequently (for example, which may enable improved access to the wireless communication system for user equipments (UEs), but may increase a power consumption of the cell), and the cell transmitting the signals less frequently (for example, which may conserve power of the cell, but may degrade network access for UEs). Accordingly, it may be beneficial for a cell to transmit the signals less frequently to improve network energy efficiency while also not significantly degrading network access for UEs. To achieve this balance, a cell (or a network node associated with the cell) may transition between an energy saving mode and an active mode. For example, while operating in the energy saving mode, the cell may reduce its power consumption by deactivating, or reducing the rate of (for example, the frequency of), the transmission of certain signals, such as SIBs, or SSBs, among other examples.

In some examples, a first cell of the wireless communication system (for example, a macro cell) may operate in an active mode (for example, to provide wireless communication coverage for UEs associated with the first cell) while, within a coverage area of the first cell, one or more other cells (for example, one or more pico cells or femto cells) each operate in an energy saving mode. In some examples, it may be desirable for a UE to connect and communicate with one of the other cells to improve throughput or a user experience of the UE. However, the UE may be unable to discover or identify the cells that are operating in the energy saving mode. For example, the other cells may not transmit reference signals associated with UE mobility or channel access (for example, SIBs, SSBs, downlink keep-alive signals, or other discovery signals) while operating in the energy saving mode. As another example, a cell may transmit such reference signals while operating in the energy saving mode, but UEs may be barred from accessing the cell because it is operating in the energy saving mode.

In some situations, to establish a connection with a second cell that is operating in an energy saving mode, a UE may perform one or more radio resource management (RRM) procedures to connect with the first cell and perform measurements associated with the second cell (such as cell search procedures or handover procedures). However, the RRM procedures may introduce delay, significant signaling overhead, and power consumption by the UE and the network nodes associated with the UE connecting with the second cell. But without such RRM procedures, it may be difficult or impossible for the first cell (or a network node associated with the first cell) to determine which cells, that are currently operating in an energy saving mode, are candidates to be transitioned to the active mode to potentially serve the UE. As a result, the first cell (or the network node) may select a cell, that is operating in the energy saving mode, to transition to the active mode that is not suitable to serve the UE (for example, when the selected cell is not geographically located proximate to the UE or when the UE is not within a coverage area of the selected cell). As a result, the selected cell, that is not suitable to serve the UE, may needlessly consume power associated with transitioning to the active mode.

SUMMARY

Some aspects described herein relate to a UE for wireless communication. The UE may include at least one memory and at least one processor, communicatively coupled with the at least one memory. The at least one processor may be configured to cause the UE to monitor a control channel of a first cell associated with a first network node based at least in part on the first cell operating in a first operating mode. The at least one processor may be configured to cause the UE to transmit, to the first network node or a second network node, a first signal associated with establishing a connection with the first cell or with a second cell associated with the first network node or the second network node, the second cell operating in a second operating mode, the first signal being transmitted based at least in part on at least one of: a paging signal associated with the first cell, or one or more measurements associated with the second cell.

Some aspects described herein relate to a first network node for wireless communication. The first network node may include at least one memory and at least one processor, communicatively coupled with the at least one memory. The at least one processor may be configured to cause the first network node to receive an indication for a first cell to monitor one or more time-frequency resources that are associated with a channel access procedure that is associated with a UE, the first cell operating in a first operating mode, and the channel access procedure being associated with the UE and a second cell that is operating in a second operating mode. The at least one processor may be configured to cause the first network node to receive, based at least in part on monitoring the one or more time-frequency resources, one or more signals associated with the UE. The at least one processor may be configured to cause the first network node to perform an action associated with the first operating mode based at least in part on one or more measurements associated with the one or more signals.

Some aspects described herein relate to a first network node for wireless communication. The first network node may include at least one memory and at least one processor, communicatively coupled with the at least one memory. The at least one processor may be configured to cause the first network node to transmit a paging signal intended for a UE, the paging signal being associated with a first cell that is operating in a first operating mode. The at least one processor may be configured to cause the first network node to receive information associated with one or more cells that are operating in a second operating mode based at least in part on transmitting the paging signal, the information being received from the UE or from the one or more cells.

Some aspects described herein relate to a method of wireless communication performed by a UE. The method may include monitoring a control channel of a first cell associated with a first network node based at least in part on the first cell operating in a first operating mode. The method may include transmitting, to the first network node or a second network node, a first signal associated with establishing a connection with the first cell or with a second cell associated with the first network node or the second network node, the second cell operating in a second operating mode, the first signal being transmitted based at least in part on at least one of: a paging signal associated with the first cell, or one or more measurements associated with the second cell.

Some aspects described herein relate to a method of wireless communication performed by a first network node. The method may include receiving an indication for a first cell to monitor one or more time-frequency resources that are associated with a channel access procedure that is associated with a UE, the first cell operating in a first operating mode, and the channel access procedure being associated with the UE and a second cell that is operating in a second operating mode. The method may include receiving, based at least in part on monitoring the one or more time-frequency resources, one or more signals associated with the UE. The method may include performing an action associated with the first operating mode based at least in part on one or more measurements associated with the one or more signals.

Some aspects described herein relate to a method of wireless communication performed by a first network node. The method may include transmitting a paging signal intended for a UE, the paging signal being associated with a first cell that is operating in a first operating mode. The method may include receiving information associated with one or more cells that are operating in a second operating mode based at least in part on transmitting the paging signal, the information being received from the UE or from the one or more cells.

Some aspects described herein relate to a non-transitory computer-readable medium that stores a set of instructions for wireless communication by a UE. The set of instructions, when executed by one or more processors of the UE, may cause the UE to monitor a control channel of a first cell associated with a first network node based at least in part on the first cell operating in a first operating mode. The set of instructions, when executed by one or more processors of the UE, may cause the UE to transmit, to the first network node or a second network node, a first signal associated with establishing a connection with the first cell or with a second cell associated with the first network node or the second network node, the second cell operating in a second operating mode, the first signal being transmitted based at least in part on at least one of: a paging signal associated with the first cell, or one or more measurements associated with the second cell.

Some aspects described herein relate to a non-transitory computer-readable medium that stores a set of instructions for wireless communication by a first network node. The set of instructions, when executed by one or more processors of the first network node, may cause the first network node to receive an indication for a first cell to monitor one or more time-frequency resources that are associated with a channel access procedure that is associated with a UE, the first cell operating in a first operating mode, and the channel access procedure being associated with the UE and a second cell that is operating in a second operating mode. The set of instructions, when executed by one or more processors of the first network node, may cause the first network node to receive, based at least in part on monitoring the one or more time-frequency resources, one or more signals associated with the UE. The set of instructions, when executed by one or more processors of the first network node, may cause the first network node to perform an action associated with the first operating mode based at least in part on one or more measurements associated with the one or more signals.

Some aspects described herein relate to a non-transitory computer-readable medium that stores a set of instructions for wireless communication by a first network node. The set of instructions, when executed by one or more processors of the first network node, may cause the first network node to transmit a paging signal intended for a UE, the paging signal being associated with a first cell that is operating in a first operating mode. The set of instructions, when executed by one or more processors of the first network node, may cause the first network node to receive information associated with one or more cells that are operating in a second operating mode based at least in part on transmitting the paging signal, the information being received from the UE or from the one or more cells.

Some aspects described herein relate to an apparatus for wireless communication. The apparatus may include means for monitoring a control channel of a first cell associated with a first network node based at least in part on the first cell operating in a first operating mode. The apparatus may include means for transmitting, to the first network node or a second network node, a first signal associated with establishing a connection with the first cell or with a second cell associated with the first network node or the second network node, the second cell operating in a second operating mode, the first signal being transmitted based at least in part on at least one of: a paging signal associated with the first cell, or one or more measurements associated with the second cell.

Some aspects described herein relate to an apparatus for wireless communication. The apparatus may include means for receiving an indication for a first cell to monitor one or more time-frequency resources that are associated with a channel access procedure that is associated with a UE, the first cell operating in a first operating mode, and the channel access procedure being associated with the UE and a second cell that is operating in a second operating mode. The apparatus may include means for receiving, based at least in part on monitoring the one or more time-frequency resources, one or more signals associated with the UE. The apparatus may include means for performing an action associated with the first operating mode based at least in part on one or more measurements associated with the one or more signals.

Some aspects described herein relate to an apparatus for wireless communication. The apparatus may include means for transmitting a paging signal intended for a UE, the paging signal being associated with a first cell that is operating in a first operating mode. The apparatus may include means for receiving information associated with one or more cells that are operating in a second operating mode based at least in part on transmitting the paging signal, the information being received from the UE or from the one or more cells.

Aspects generally include a method, apparatus, system, computer program product, non-transitory computer-readable medium, user equipment, base station, network node, network entity, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
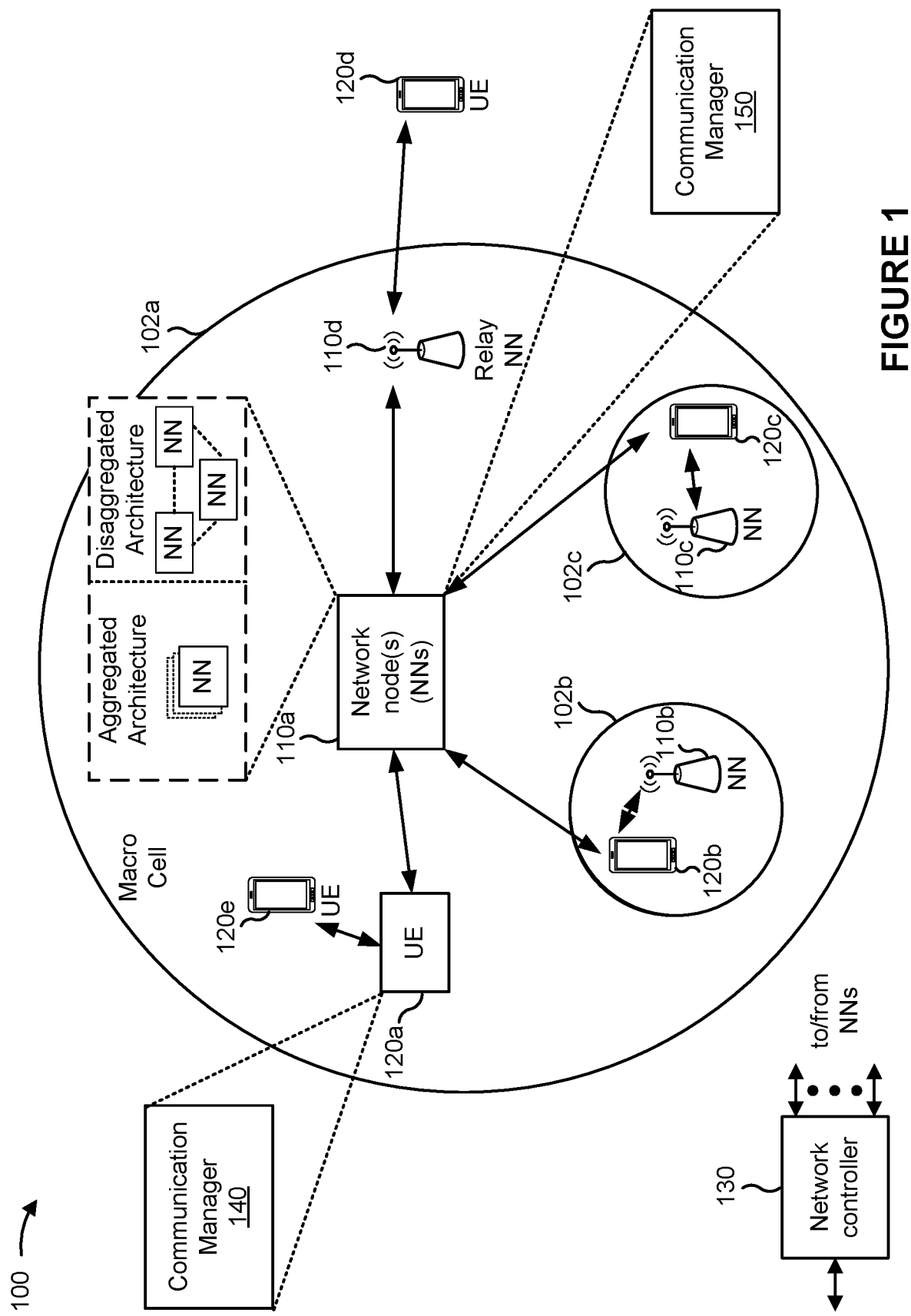
FIG. 1 is a diagram illustrating an example of a wireless network, in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to network access control for a user equipment (UE) accessing a wireless network that is associated with one or more network nodes or cells that are operating in an energy saving mode. Some aspects more specifically relate to enabling a network node to identify other network nodes or cells operating in an energy saving mode that should be transitioned to an active mode to become candidates to serve one or more UEs. In some aspects, the network node may then, based at least in part on identifying that at least one of the other network nodes is suitable to serve one or more UEs, cause the identified network node to transition to an active mode to facilitate channel access for the UE via the identified network node. For example, in some aspects, a first network node may transmit, and a UE may receive, a paging signal. The UE may transmit a random access channel (RACH) communication, using time-frequency resources associated with a RACH occasion, in response to the paging signal. A second network node (for example, operating in an energy saving mode) may receive, from the first network node or another network node, an indication to monitor time-frequency resources that are associated with the RACH occasion. The second network node may detect or measure the RACH communication based at least in part on monitoring the time-frequency resources. The second network node may then transmit to the first network node a report indicating that the RACH communication was detected or indicating one or more measurements of the RACH communication. The first network node may then determine whether the second network node is suitable to serve the UE based at least in part on the report indicating that the RACH communication was detected by the second network node or based at least in part on one or more of the measurements of the RACH communication satisfying a threshold. In some examples, based at least in part on determining that the second network node is suitable to serve the UE, the first network node may transmit, and the UE may receive, a paging communication that indicates to the UE to establish a connection (for example, a radio resource control (RRC) connection) with the second network node.

Additionally or alternatively, in some examples, the second network node (for example, while the second network node is operating in the energy saving mode) may transmit, and the UE (for example, while the UE is operating in an idle or inactive mode) may receive, one or more discovery signals, such as a downlink keep-alive signal. The UE may measure the one or more discovery signals and, upon establishing a connection with the first network node, may transmit, to the first network node, an indication of one or more measurements of the one or more discovery signals. The first network node may then determine whether the second network node is suitable to serve the UE based at least in part on one or more of the measurements of the one or more discovery signals satisfying a threshold. As described above, in some examples, based at least in part on determining that the second network node is suitable to serve the UE, the first network node may transmit, and the UE may receive, a paging communication that indicates to the UE to establish a connection (for example, a RRC connection) with the second network node.

Particular aspects of the subject matter described in this disclosure can be implemented to realize one or more of the following potential advantages. In some examples, the described techniques can be used to enable a network node to identify one or more other network nodes or cells that are currently operating in an energy saving mode but that may be suitable to serve the UE if transitioned to an active mode. This may conserve time, processing resources, power resources, or signaling overhead that would have otherwise been used to perform RRM procedures to identify the other network nodes or cells. Additionally, this may conserve power resources of a network node by improving a likelihood that the network node (for example, that is not suitable to serve the UE) is able to remain in the energy saving mode.

FIG. 1 is a diagram illustrating an example of a wireless network in accordance with the present disclosure. The wireless network 100 may be or may include elements of a 5G (for example, NR) network or a 4G (for example, Long Term Evolution (LTE)) network, among other examples. The wireless network 100 may include one or more network nodes 110 (shown as a network node (NN) 110a, a network node 110b, a network node 110c, and a network node 110d), a user equipment (UE) 120 or multiple UEs 120 (shown as a UE 120a, a UE 120b, a UE 120c, a UE 120d, and a UE 120e), or other network entities. A network node 110 is an entity that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, or one or more DUs. A network node 110 may include, for example, an NR network node, an LTE network node, a Node B, an eNB (for example, in 4G), a gNB (for example, in 5G), an access point, or a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, or backhaul interfaces, such as a direct physical connection, an air interface, or a virtual network, using any suitable transport network.

Each network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used.

A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts). In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (for example, three) cells. In some examples, a cell may not necessarily be stationary, and the geographic area of the cell may move according to the location of a network node 110 that is mobile (for example, a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

A network controller 130 may couple to or communicate with a set of network nodes 110 and may provide coordination and control for these network nodes 110. The network controller 130 may communicate with the network nodes 110 via a backhaul communication link. The network nodes 110 may communicate with one another directly or indirectly via a wireless or wireline backhaul communication link. In some aspects, the network controller 130 may be a CU or a core network device, or the network controller 130 may include a CU or a core network device.

In some examples, a cell may not necessarily be stationary, and the geographic area of the cell may move in accordance with the location of a network node 110 that is mobile (for example, a mobile network node). In some examples, the network nodes 110 may be interconnected to one another or to one or more other network nodes 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a network node 110 or a UE 120) and send a transmission of the data to a downstream station (for example, a UE 120 or a network node 110). A relay station may be a UE 120 that can relay transmissions for other UEs 120. In the example shown in FIG. 1, the network node 110d (for example, a relay network node) may communicate with the network node 110a (for example, a macro network node) and the UE 120d in order to facilitate communication between the network node 110a and the UE 120d. A network node 110 that relays communications may be referred to as a relay station, a relay network node, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any quantity of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, the term "sub-6 GHz," if used herein, may broadly represent frequencies that may be less than 6 GHz, may be within FR1, or may include mid-band frequencies. Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may monitor a control channel of a first cell associated with a first network node based at least in part on the first cell operating in a first operating mode; and transmit, to the first network node or a second network node, a first signal associated with establishing a connection with the first cell or with a second cell associated with the first network node or the second network node, the second cell operating in a second operating mode, the first signal being transmitted based at least in part on at least one of: a paging signal associated with the first cell, or one or more measurements associated with the second cell. Additionally or alternatively, the communication manager 140 may perform one or more other operations described herein.

In some aspects, a first network node 110 (for example, the network node 110b or the network node 110c) may include a communication manager 150. As described in more detail elsewhere herein, the communication manager 150 may receive an indication for a first cell to monitor one or more time-frequency resources that are associated with a channel access procedure that is associated with a UE, the first cell operating in a first operating mode, and the channel access procedure being associated with the UE and a second cell that is operating in a second operating mode; receive, based at least in part on monitoring the one or more time-frequency resources, one or more signals associated with the UE; and perform an action associated with the first operating mode based at least in part on one or more measurements associated with the one or more signals. Additionally or alternatively, the communication manager 150 may perform one or more other operations described herein.

In some aspects, a first network node 110 (for example, the network node 110a) may include a communication manager 150. As described in more detail elsewhere herein, the communication manager 150 may transmit a paging signal intended for a UE, the paging signal being associated with a first cell that is operating in a first operating mode; and receive information associated with one or more cells that are operating in a second operating mode based at least in part on transmitting the paging signal, the information being received from the UE or from the one or more cells. Additionally or alternatively, the communication manager 150 may perform one or more other operations described herein.

Figure 2:
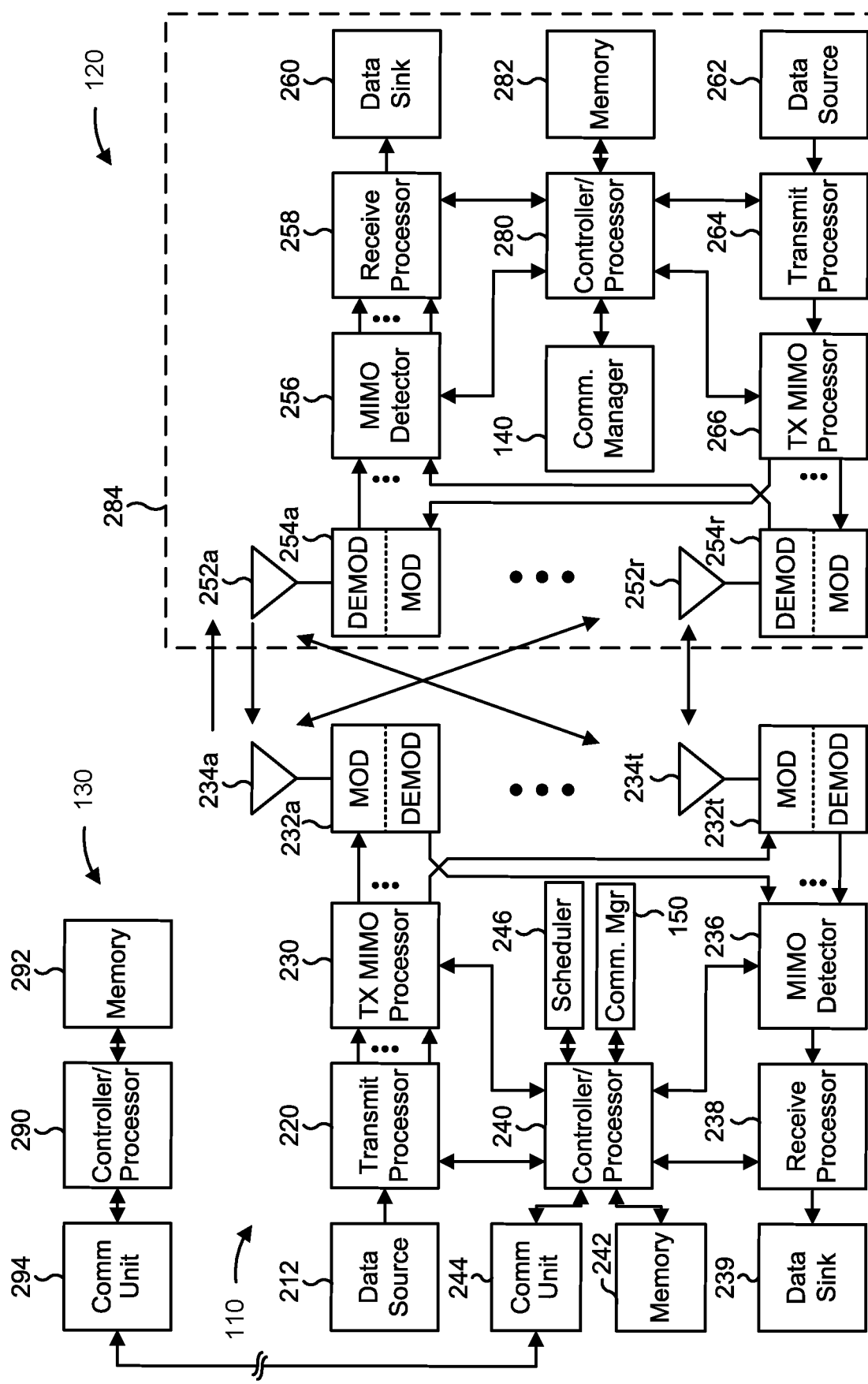
FIG. 2 is a diagram illustrating an example network node in communication with a user equipment (UE) in a wireless network, in accordance with the present disclosure.

FIG. 2 is a diagram illustrating an example network node in communication with a UE in a wireless network in accordance with the present disclosure. The network node may correspond to the network node 110 of FIG. 1. Similarly, the UE may correspond to the UE 120 of FIG. 1. The network node 110 may be equipped with a set of antennas 234a through 234t, such as T antennas (T≥1). The UE 120 may be equipped with a set of antennas 252a through 252r, such as R antennas (R≥1). The network node 110 of depicted in FIG. 2 includes one or more radio frequency components, such as antennas 234 and a modem 254. In some examples, a network node 110 may include an interface, a communication component, or another component that facilitates communication with the UE 120 or another network node.

Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the network node 110 or other network nodes 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the network node 110, the controller/processor 280 of the UE 120, or any other component(s) of FIG. 2 may perform one or more techniques associated with access control for network energy savings, as described in more detail elsewhere herein. For example, the controller/processor 240 of the network node 110, the controller/processor 280 of the UE 120, or any other component(s) of FIG. 2 may perform or direct operations of, for example, process 800 of FIG. 8, process 900 of FIG. 9, process 1000 of FIG. 10, or other processes as described herein. The memory 242 and the memory 282 may store data and program codes for the network node 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 800 of FIG. 8, process 900 of FIG. 9, process 1000 of FIG. 10, or other processes as described herein. In some examples, executing instructions may include running the instructions, converting the instructions, compiling the instructions, or interpreting the instructions, among other examples.

In some aspects, the UE 120 includes means for monitoring a control channel of a first cell associated with a first network node based at least in part on the first cell operating in a first operating mode; or means for transmitting, to the first network node or a second network node, a first signal associated with establishing a connection with the first cell or with a second cell associated with the first network node or the second network node, the second cell operating in a second operating mode, the first signal being transmitted based at least in part on at least one of: a paging signal associated with the first cell, or one or more measurements associated with the second cell. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a first network node 110 includes means for receiving an indication for a first cell to monitor one or more time-frequency resources that are associated with a channel access procedure that is associated with a UE, the first cell operating in a first operating mode, and the channel access procedure being associated with the UE and a second cell that is operating in a second operating mode; means for receiving, based at least in part on monitoring the one or more time-frequency resources, one or more signals associated with the UE; or means for performing an action associated with the first operating mode based at least in part on one or more measurements associated with the one or more signals. In some aspects, the means for the first network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, a first network node 110 includes means for transmitting a paging signal intended for a UE, the paging signal being associated with a first cell that is operating in a first operating mode; or means for receiving information associated with one or more cells that are operating in a second operating mode based at least in part on transmitting the paging signal, the information being received from the UE or from the one or more cells. In some aspects, the means for the first network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (for example, an aggregated network node) may be configured to utilize a radio protocol stack that is physically or logically integrated within a single RAN node (for example, within a single device or unit). A disaggregated base station (for example, a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
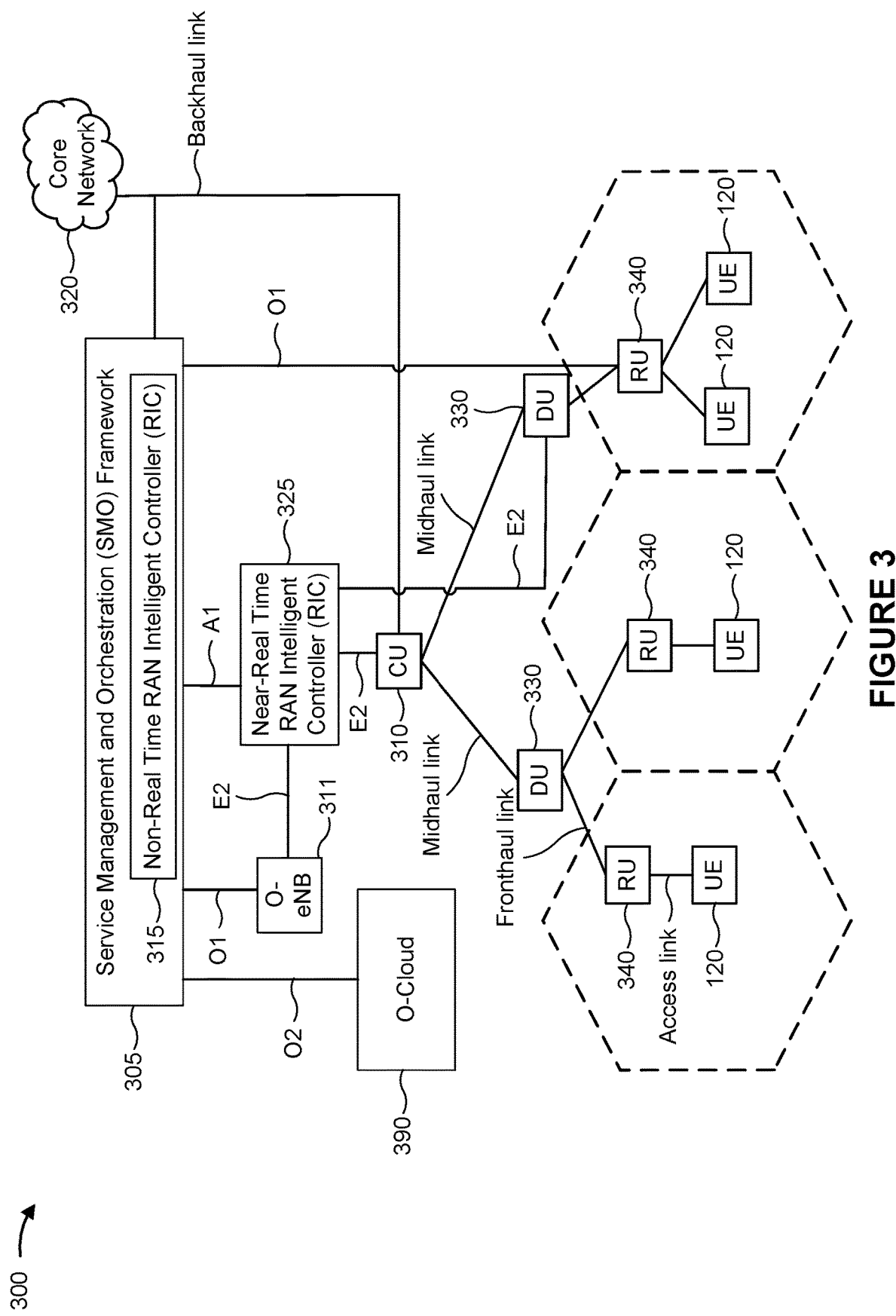
FIG. 3 is a diagram illustrating an example disaggregated base station architecture in accordance with the present disclosure.

FIG. 3 is a diagram illustrating an example disaggregated base station architecture 300 in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT MC 325. The Non-RT MC 315 may be coupled to or communicate with (such as via an A1 interface) the Near-RT RIC 325. The Near-RT MC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

Figure 4:
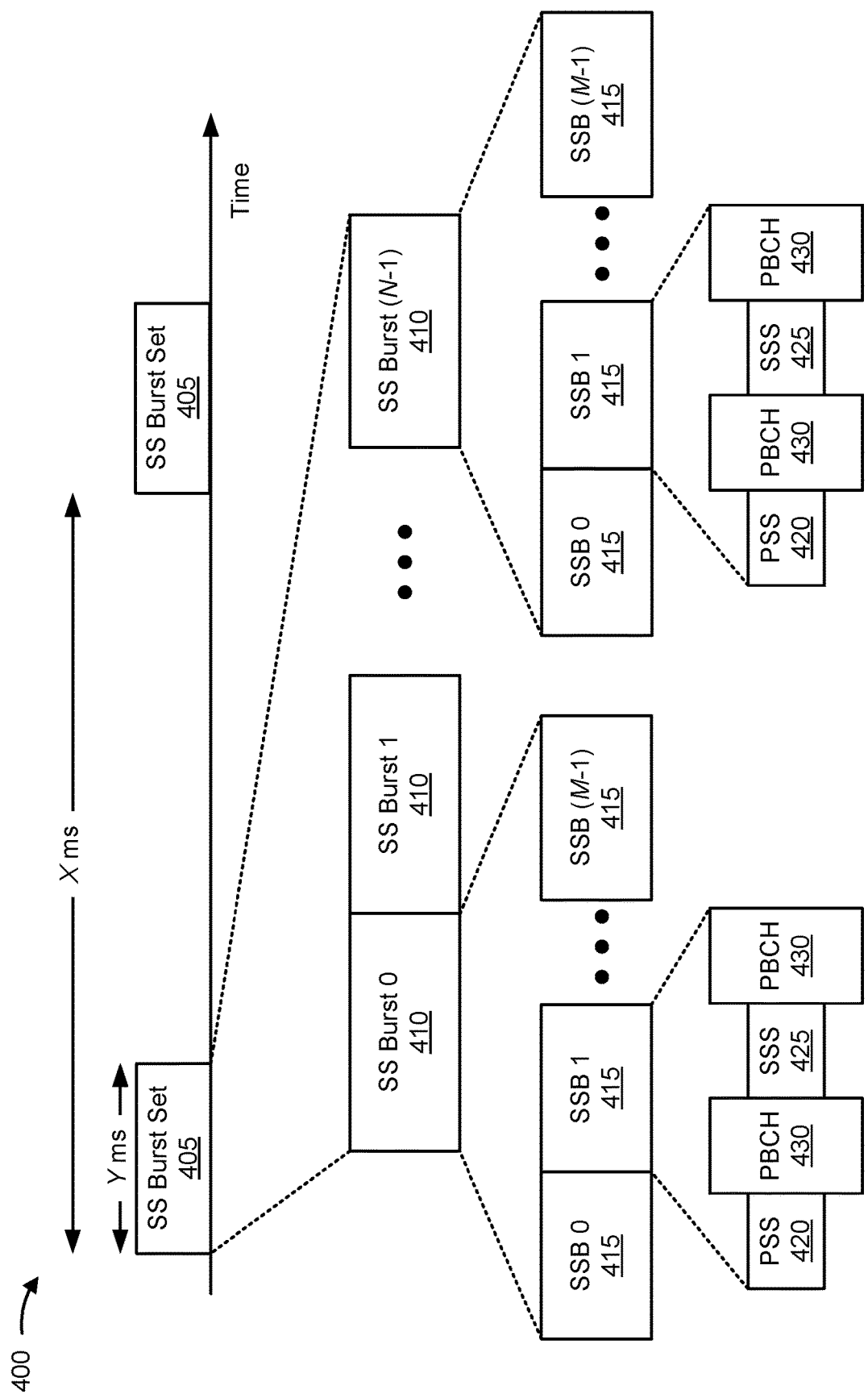
FIG. 4 is a diagram illustrating an example of a synchronization signal (SS) hierarchy, in accordance with the present disclosure.

FIG. 4 is a diagram illustrating an example of a synchronization signal (SS) hierarchy 400, in accordance with the present disclosure. As shown in FIG. 4, the SS hierarchy may include an SS burst set 405, which may include multiple SS bursts 410, shown as SS burst 0 through SS burst N−1, where N is a maximum quantity of repetitions of the SS burst 410 that may be transmitted by one or more network nodes. As further shown, each SS burst 410 may include one or more SS blocks (SSBs) 415, shown as SSB through SSB M−1, where M is a maximum quantity of SSBs 415 that can be carried by an SS burst 410. In some examples, different SSBs 415 may be beam-formed differently (for example, transmitted using different beams), and may be used for cell search, cell acquisition, beam management, or beam selection (for example, as part of an initial network access procedure). An SS burst set 405 may be periodically transmitted by a wireless node (for example, a network node 110), such as every X milliseconds, as shown in FIG. 4. In some examples, an SS burst set 405 may have a fixed or dynamic length, shown as Y milliseconds in FIG. 4. In some cases, an SS burst set 405 or an SS burst 410 may be referred to as a discovery reference signal (DRS) transmission window or an SSB measurement time configuration (SMTC) window.

In some examples, an SSB 415 may include resources that carry a primary synchronization signal (PSS) 420, a secondary synchronization signal (SSS) 425, or a physical broadcast channel (PBCH) 430. In some examples, multiple SSBs 415 are included in an SS burst 410 (for example, with transmission on different beams), and the PSS 420, the SSS 425, or the PBCH 430 may be the same across each SSB 415 of the SS burst 410. In some examples, a single SSB 415 may be included in an SS burst 410. In some examples, the SSB 415 may be at least four symbols (for example, OFDM symbols) in length, where each symbol carries one or more of the PSS 420 (for example, occupying one symbol), the SSS 425 (for example, occupying one symbol), or the PBCH 430 (for example, occupying two symbols). In some examples, an SSB 415 may be referred to as an SS/PBCH block. A PSS may be within symbol 2 of particular subframes of a frame. The PSS may be used by a UE to determine subframe/symbol timing and a physical layer identity. The SSS may be within symbol 4 of particular subframes of a frame. The SSS may be used by a UE to determine a physical layer cell identity group number and radio frame timing. Based on the physical layer identity and the physical layer cell identity group number, the UE can determine a physical cell identifier (PCI). Based on the PCI, the UE can determine the locations of a DMRS. The PBCH, which may carry a master information block (MIB), may be logically grouped with the PSS and SSS to form a synchronization signal (SS)/PBCH block. The MIB may indicate a quantity of resource blocks in a system bandwidth and a system frame number (SFN). The physical downlink shared channel (PDSCH) may carry user data, broadcast system information not transmitted through the PBCH, such as system information blocks (SIBs), or paging messages.

In some examples, the symbols of an SSB 415 are consecutive, as shown in FIG. 4. In some examples, the symbols of an SSB 415 are non-consecutive. Similarly, in some examples, one or more SSBs 415 of the SS burst 410 may be transmitted in consecutive radio resources (for example, consecutive symbols) during one or more slots. Additionally or alternatively, one or more SSBs 415 of the SS burst 410 may be transmitted in non-consecutive radio resources.

In some examples, the SS bursts 410 may have a burst period, and the SSBs 415 of the SS burst 410 may be transmitted by a wireless node (for example, a network node 110) according to the burst period. In this case, the SSBs 415 may be repeated during each SS burst 410. In some examples, the SS burst set 405 may have a burst set periodicity, whereby the SS bursts 410 of the SS burst set 405 are transmitted by the wireless node according to the fixed burst set periodicity. In other words, the SS bursts 410 may be repeated during each SS burst set 405.

In some examples, an SSB 415 may include an SSB index, which may correspond to a beam used to carry the SSB 415. A UE 120 may monitor for or measure SSBs 415 using different receive (Rx) beams during an initial network access procedure or a cell search procedure, among other examples. Based at least in part on the monitoring or measuring, the UE 120 may indicate one or more SSBs 415 with a best signal parameter (for example, a reference signal received power (RSRP) parameter) to a network node 110 (for example, directly or via one or more other network nodes). The network node 110 and the UE 120 may use the one or more indicated SSBs 415 to select one or more beams to be used for communication between the network node 110 and the UE 120 (for example, for a random access channel (RACH) procedure). Additionally or alternatively, the UE 120 may use the SSB 415 or the SSB index to determine a cell timing for a cell via which the SSB 415 is received (for example, a serving cell).

Network nodes in a wireless communication system may broadcast one or more information-bearing signals that allow devices, such as UEs, to find, connect to, and interact with the wireless communication system. One example is a network node periodically broadcasting "system information," which may refer to common (for example, non-device-specific) information that a device, such as a UE, needs in order to properly operate within the wireless communication network. System information is often transmitted within SIBs, which may include different types of system information. One such system information block is referred to as "SIB 1" (which may also be referred to as the remaining minimum system information (RMSI)) and which may include the system information that a UE may need to access the wireless communication system, such as information that the UE needs in order to carry out an initial random access procedure (for example, a RACH procedure). Conventionally, SIBs, including SIB 1, are broadcast periodically over an entire cell area. Another example is a network node periodically broadcasting the PSS, the SSS, and the PBCH, each of which is used by UEs to find, synchronize to, and identify a network. As described above, the PSS, SSS, and PBCH may be jointly referred to as an SSB.

Power consumed by a wireless communication system (for example, by one or more network nodes) is a significant operational and environmental issue. There may be a tension between more frequent broadcasts of signals, such as SIBs and SSBs, which enable fast access to the wireless communication system at the cost of increased power consumption, and less frequent broadcast of such signals, which saves power, but reduces network access speed. Accordingly, it may be desirable to limit such broadcasts of signals to improve network energy efficiency while also not negatively affecting network access.

A network node that is attempting to limit broadcasts of periodic signals, such as SIBs and SSBs, in an effort to reduce power consumption, may face a complication in that UEs may "camp on" a cell of a wireless communication system and silently rely on periodic broadcasting of signals, such as SIBs and SSBs, without a network node associated with the cell being aware of the camping UE. "Camping" on a cell or network node may refer to a UE monitoring broadcasts from a cell (for example, monitoring a control channel associated with the cell or the network node) to maintain readiness to actively connect with the cell or network node and utilize the wireless communication system. Consequently, it may not be feasible for a network node to discontinue broadcasts of signals used by camping UEs (for example, UEs operating in RRC idle mode) merely because no UE is currently actively utilizing the network node (for example, no UEs are connected with the cell in an RRC connected mode) and interacting with the wireless communication system. Thus, a problem arises in how a network node can determine when the network node can enter an energy saving mode (or state) in which certain broadcasts are limited or stopped (such as SIBs or SSBs) without negatively affecting camping UEs. In other words, it may be beneficial for a network node to be enabled to reduce power use whenever possible without negatively affecting devices relying on the network node, such as camping UEs. Likewise, it may be beneficial for UEs to be able to enter and maintain lower power modes, such as an RRC idle and an RRC inactive modes, more often while maintaining the ability to quickly connect to a wireless communications network, such as by transitioning to an RRC connected mode.

Figure 5:
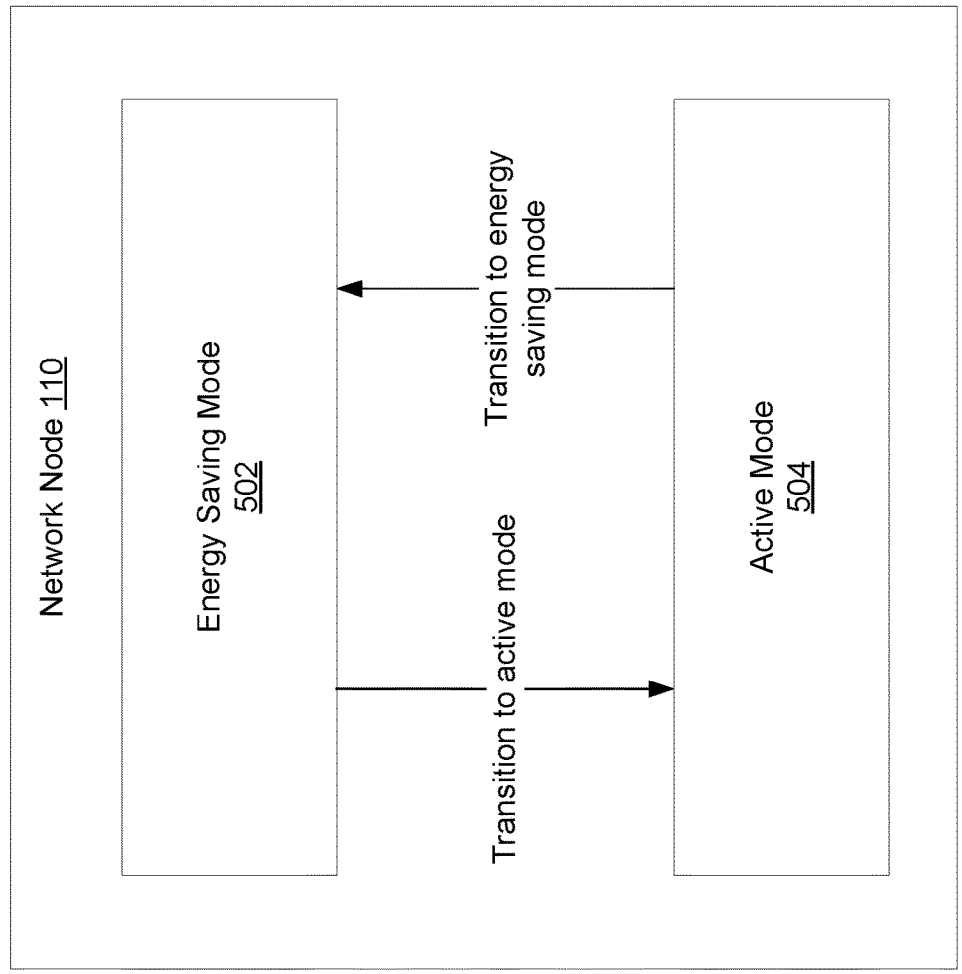
FIG. 5 is a diagram illustrating an example mode transition for a network node, in accordance with the present disclosure.
Figure 6B:
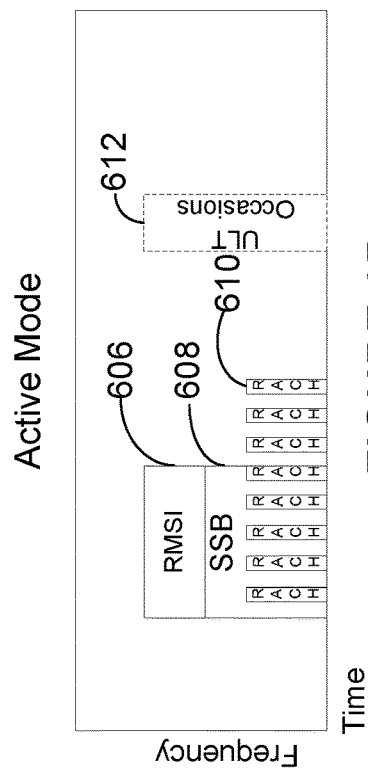
FIGS. 6A and 6B are diagrams illustrating examples of time and frequency resource allocations for different network node operating modes, in accordance with the present disclosure.
Figure 6A:
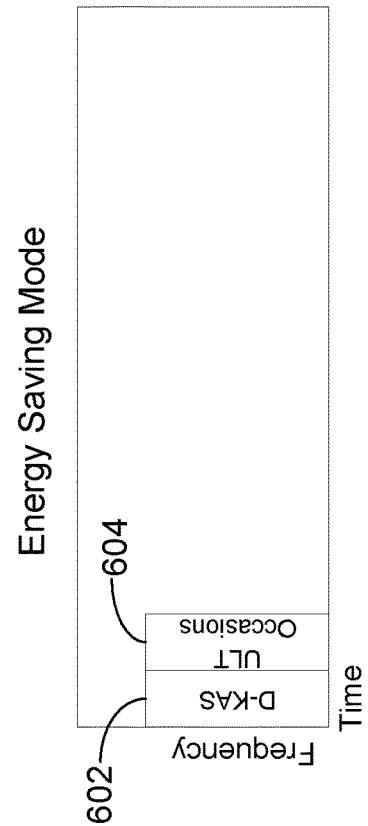

FIG. 5 is a diagram illustrating an example mode transition 500 for a network node 110, in accordance with the present disclosure. As depicted, a network node 110 may be in an energy saving (or low power) mode 502 in which certain periodic broadcasts are deactivated, such as the broadcast of SIBs or SSBs, as well as certain non-periodic signals, such as paging signals. FIG. 6A depicts an example of a reduced time and frequency resource allocation in the energy saving mode 502 that may be used by network node 110. A cell operating in the energy saving mode 502 may be referred to as an "energy saving cell."

While operating in the energy saving mode 502, the network node 110 may reduce power use of the network node 110 by deactivating, or reducing the rate of (for example, the frequency of), the broadcast of certain signals, such as SIBs, SSBs, or paging signals, among other examples. The network node 110 may further save energy by not monitoring for certain signals, such as not monitoring for RACH signals during configured RACH occasions.

In some examples, the network node 110 may maintain the ability for UEs to camp on a cell associated with the network node 110 by continuing to transmit downlink discovery signals, which may be referred to as a "keep-alive" signals, among other examples. In some examples, a downlink keep-alive signal may be a standard downlink reference signal, or a simplified downlink reference signal, that can be used by a UE to discover network node 110. For example, a standard downlink reference signal for synchronization is an SSB, which may include four symbols (1 symbol for a PSS, 1 symbol for an SSS, and two symbols of a PBCH). A simplified downlink reference signal for a keep-alive signal may include less information or fewer quantities of symbols (for example, one or two of the aforementioned set of four). However, the network node 110 may also be configured to deactivate any periodic downlink signal in energy saving mode 502.

The keep-alive signal may be a periodic signal that indicates the presence of the network node 110 (for example, of a cell associated with the network node 110). In some examples, the keep-alive signal may include one or more generation sequences that are configured to indicate the presence of a cell in an energy saving mode. In some examples, the network node 110 may select the generation sequence(s) for the keep-alive signal from a set of candidate generation sequences that are configured to indicate the presence of a cell in the energy saving mode. A generation sequence is a sequence (for example, m-sequence, Zadoff-Chu sequence, or Gold sequence) used to generate a signal, such as the keep-alive signal. The network node 110, to transmit the keep-alive signal, may map the generation sequence(s) for the keep-alive signal onto a quantity of subcarriers corresponding to a length of the generation sequence(s).

Generally, the network node 110 may maintain the energy saving mode 502 until the network node 110 receives an uplink trigger message from a UE. An uplink trigger may be, for example, an initial uplink trigger message if a UE is initiating camping, or an uplink keep-alive signal if the UE is maintaining camping. In some aspects, the uplink trigger message may be (or may be based on) a random access channel preamble format. In other aspects, the uplink trigger message may be based on a preconfigured uplink resource.

When the network node 110 is configured to deactivate (and thus not transmit) any periodic downlink signals in energy saving mode 502, a UE may need to send an uplink trigger message in multiple directions, because the UE may not receive any signals from the network node 110 indicating a relative direction of the network node 110 with respect to the UE. This may be particularly useful when the UE is seeking to connect using higher frequency bands that are more sensitive to directionality.

After receiving the uplink trigger message, the network node 110 may transition to an active mode 504. In the active mode 504, the network node 110 may resume certain periodic broadcasts, such as SIBs in SSBs, which were deactivated for energy saving mode 502. FIG. 6B depicts an example of a time and frequency resource allocation in an active mode that may be used by the network node 110.

Generally, when operating in the active mode 504, the network node 110 may broadcast periodic signals, such as SIBs and SSBs, on a normal (for example, pre-configured or standards-defined) schedule. The network node 110, when operating in the active mode 504, may deactivate or discontinue certain broadcasts that are active during energy saving mode 502, such as a broadcast of the downlink keep-alive signal, because the network node 110 is already broadcasting other signals that perform the same or a similar function (for example, SSBs). However, in some examples, the network node 110 may activate (or maintain) periodic occasions for monitoring for uplink keep-alive signals. For example, if the network node 110 is operating in the active mode 504, the network node 110 may be running a timer and, upon expiry of such a timer, the network node 110 may deactivate broadcasting signals (for example, in at least some spatial directions). Maintaining monitoring occasions for uplink keep-alive signals allows a UE camping on the network node 110 to indicate to the network node 110 that the network node 110 should remain active (for example, remain operating in the active mode 504). The reception of an uplink keep-alive signal may reset any currently running timer for mode transitions.

Further, the uplink keep-alive signal may be utilized to reduce the overhead of RMSI, RACH, or paging, among other examples. For example, the network node 110 may not send paging (or may deprioritize sending paging) when there are no camping UEs, such as when the network node 110 does not detect any uplink trigger signal. In some examples, RMSI, RACH, or paging, among other examples, may be supported only in spatial directions where the network node 110 detects (or has detected) uplink signals, such as an uplink trigger signal.

After transitioning to the active mode 504, the network node 110 may initiate a timer (or count-down) and monitor for any connecting UEs or further uplink trigger messages. If, after a threshold period of time T, no UEs have connected to the network node 110 (for example, entered RRC connected mode with respect to the network node 110), and no further uplink trigger messages have been received, then the network node 110 may transition to the energy saving mode 502. In some examples, the threshold period of time T may be measured from receipt of the latest uplink trigger message. In others examples, the threshold period of time T may be measured from a time at which the network node 110 transitions to the active mode 504.

In some aspects, network node 110 may indicate the threshold period of time T to a UE. For example, the threshold period of time T may be indicated via SIB 1 when the network node 110 is operating in the active mode 504, or by system information or other dedicated signals from a different network node. As another example, the threshold period of time T may be preconfigured at the UE. Knowing the threshold period of time T may allow a UE to transmit uplink trigger messages, or other uplink signals, to the network node 110 on-time in order to keep the network node 110 from transitioning to the energy saving mode 502. For example, the UE may transmit uplink trigger messages to keep the network node 110 in the active mode 504 to ensure that the network node 110 continues to transmit SSBs.

The transition between the energy saving mode 502 and the active mode 504 may be spatial-direction-specific, cell-specific, or beam-specific, among other examples. For example, one cell of a network node 110 may be operating in the energy saving mode 502 while one or more other cells of the network node 110 are operating in the active mode 504. Similarly, in a disaggregated RAN context, one RU may be operating in the energy saving mode 502 while one or more other RUs are operating in the active mode 504. As yet another example, the network node 110 may operate in the energy saving mode 502 for communications associated with one or more beams (for example, as defined by an SSB). The network node 110 may operate in the active mode 504 for communications associated with other beams. In this way, the opportunities to transition to the energy saving mode 502 may be maximized while maintaining ready access to a wireless communications network associated with the network node 110.

FIGS. 6A and 6B are diagrams illustrating examples of time and frequency resource allocations for different network node operating modes, in accordance with the present disclosure. For example, FIG. 6A depicts an example of time and frequency resources for an energy saving mode (such as the energy saving modes 502), which includes resources associated with a downlink keep-alive signal 602 and resources associated with an uplink trigger monitoring occasions 604. In such examples, periodic broadcasts, such as SIBs and SSBs, as well as monitoring occasions (for example, for a RACH procedure) may be deactivated, thus saving significant power.

FIG. 6B depicts an example of time and frequency resources for an active mode (such as the active modes 504), which includes resources for RMSI 606, resources for SSB(s) 608, resources for RACH monitoring occasions 610, and, optionally, resources for periodic uplink trigger monitoring occasions 612.

The operating modes and resource allocations described above are provided as examples. In other examples, a network node 110 operating in an energy saving mode may not transmit any signals, but may monitor for certain incoming signals (for example, which may be referred to as a listen mode). In some examples, a first cell of a wireless network (for example, a macro cell) may operate in an active mode (for example, to provide wireless communication coverage for UEs associated with the first cell). Within a coverage area of the first cell, one or more other cells may be operating in an energy saving mode (for example, one or more pico cells or femto cells, located within a coverage area of a macro cell, may operate in the energy saving mode). In some examples, it may be desirable for a UE to connect with, and communicate with, the one or more other cells to improve throughput or a user experience of the UE.

However, the UE may be unable to discover or identify a cell, from the one or more other cells, that is operating in an energy saving mode. For example, a network node associated with the cell may not transmit reference signals (for example, SIBs, SSBs, downlink keep-alive signals, or other discovery signals) when operating in the energy saving mode. Therefore, the UE may be unable to discover or identify the cell or the network node. As another example, the network node associated with the cell may transmit reference signals, but the UE may be barred from accessing or selecting the cell. To establish a connection with a first network node or a first cell that is operating in the energy saving mode, the UE may establish a connection with a second network node or a second cell that is operating in an active mode (for example, a macro cell). After establishing a connection with the second network node or the second cell that is operating in the active mode, the UE may communicate with the second network node or the second cell to enable the second network node or the second cell to determine that the UE should be served by (for example, should connect to) the first network node or the first cell that is currently operating in the energy saving mode. In some examples, the first network node or the first cell may communicate with the second network node or the second cell to cause the second network node or the second cell to transition to an active mode (for example, in which the second network node or the second cell may transmit one or more reference signals, such as SIBs or SSBs). The UE may perform one or more radio resource management (RRM) procedures to connect with the second network node or the second cell. For example, the UE may receive and measure the reference signals that are transmitted by the second network node or the second cell. The UE may transmit a measurement report, indicating one or more measurements of reference signals transmitted by the second network node or the second cell, to the first network node or the first cell. The first network node or the first cell may determine that the UE should be handed over to the second network node or the second cell. The first network node or the first cell may transmit, and the UE may receive, a handover command indicating that the UE is to establish a connection with the second network node or the second cell. The UE and the second network node or the second cell may perform a channel access procedure, such as a RACH procedure, to establish a connection. However, such RRM procedures introduce significant signaling overhead and power consumption by the UE and the network nodes. Additionally, it may be difficult for the first network node to determine which network nodes or cells (for example, that are operating in an energy saving mode) are to be transitioned to the active mode to potentially serve the UE. As a result, the first network node may cause another network node or cell that is operating in the energy saving mode to transition to the active mode when the other network node or cell is not suitable to serve the UE (for example, when the other network node or cell is not geographically located proximate to the UE).

Various aspects relate generally to network access control for a UE accessing a wireless network that is associated with one or more network nodes or cells that are operating in an energy saving mode. Some aspects more specifically relate to enabling a network node to identify other network nodes or cells operating in an energy saving mode that should be transitioned to an active mode to become candidates to serve one or more UEs. In some aspects, the network node may then, based at least in part on identifying that at least one of the other network nodes is suitable to serve one or more UEs, cause the identified network node to transition to an active mode to facilitate channel access for the UE via the identified network node). For example, in some aspects, a first network node may transmit, and a UE may receive, a paging signal. The UE may transmit a random access channel (RACH) communication, using time-frequency resources associated with a RACH occasion, in response to the paging signal. A second network node (for example, operating in an energy saving mode) may receive, from the first network node or another network node, an indication to the monitor time-frequency resources that are associated with the RACH occasion. The second network node may detect or measure the RACH communication based at least in part on monitoring the time-frequency resources. The second network node may then transmit to the first network node a report indicating that the RACH communication was detected or indicating one or more measurements of the RACH communication. The first network node may then determine whether the second network node is suitable to serve the UE based at least in part on the report indicating that the RACH communication was detected by the second network node or based at least in part on one or more of the measurements of the RACH communication satisfying a threshold. In some examples, based at least in part on determining that the second network node is suitable to serve the UE, the first network node may transmit, and the UE may receive, a paging communication that indicates to the UE to establish a connection (for example, a radio resource control (RRC) connection) with the second network node.

Additionally or alternatively, in some examples, the second network node (for example, while the second network node is operating in the energy saving mode) may transmit, and the UE (for example, while the UE is operating in an idle or inactive mode) may receive, one or more discovery signals, such as a downlink keep-alive signal. The UE may measure the one or more discovery signals and, upon establishing a connection with the first network node, may transmit, to the first network node, an indication of one or more measurements of the one or more discovery signals. The first network node may then determine whether the second network node is suitable to serve the UE based at least in part on one or more of the measurements of the one or more discovery signals satisfying a threshold. As described above, in some examples, based at least in part on determining that the second network node is suitable to serve the UE, the first network node may transmit, and the UE may receive, a paging communication that indicates to the UE to establish a connection (for example, a RRC connection) with the second network node.

Particular aspects of the subject matter described in this disclosure can be implemented to realize one or more of the following potential advantages. In some examples, the described techniques can be used to enable a network node to identify one or more other network nodes or cells that are currently operating in an energy saving mode but that may be suitable to serve the UE if transitioned to an active mode. This may conserve time, processing resources, power resources, or signaling overhead that would have otherwise been used to perform RRM procedures to identify the other network nodes or cells. Additionally, this may conserve power resources of a network node by improving a likelihood that the network node (for example, that is not suitable to serve the UE) is able to remain in the energy saving mode.

Figure 7:
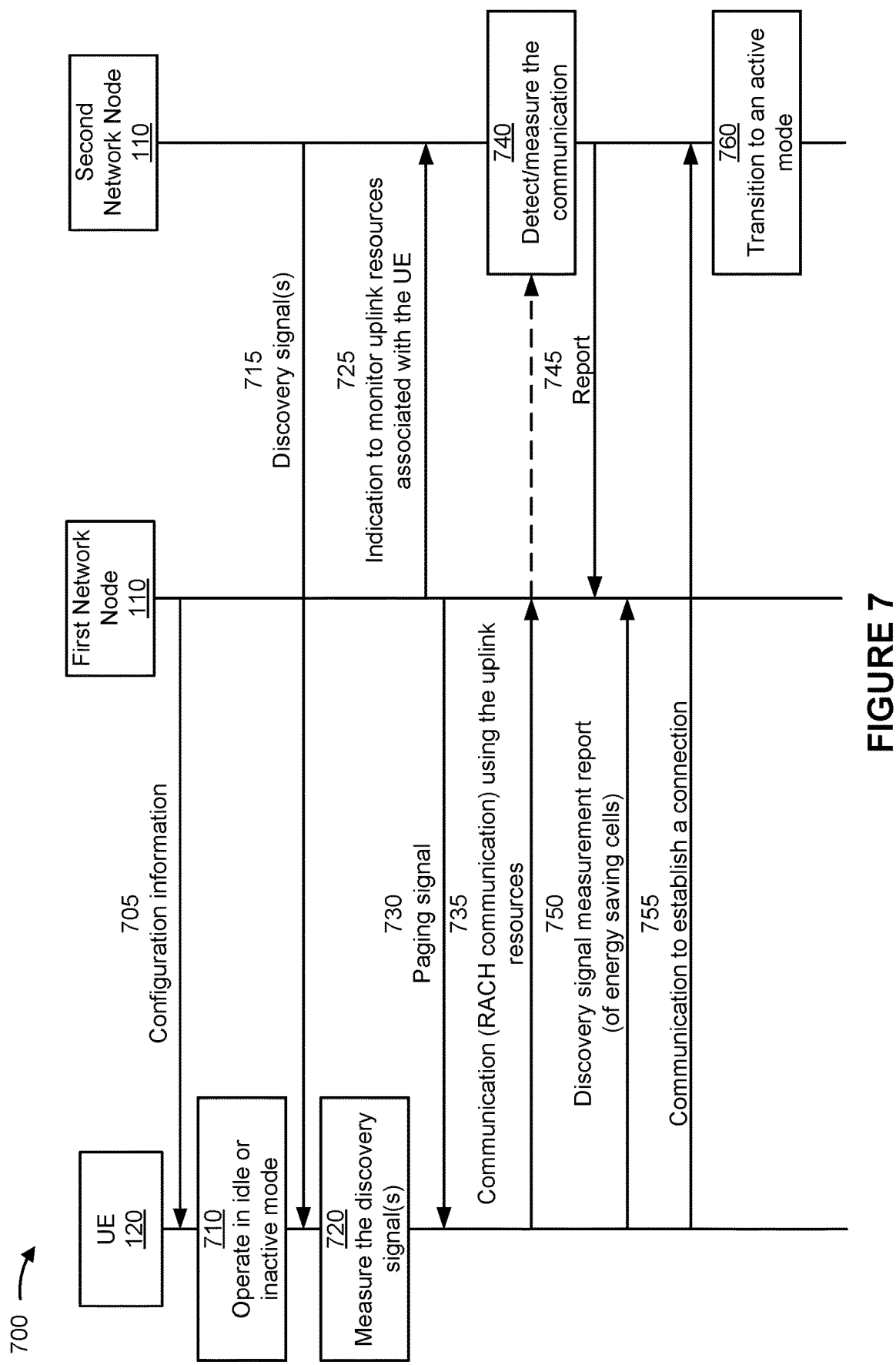
FIG. 7 is a diagram of an example associated with access control for network energy savings, in accordance with the present disclosure.

FIG. 7 is a diagram of an example associated with access control 700 for network energy savings, in accordance with the present disclosure. As shown in FIG. 7, multiple network nodes may communicate with a UE (for example, a UE 120). The multiple network nodes may include one or more network nodes 110, one or more CUs, one or more DUs, one or more RUs, one or more core network nodes, one or more network servers, one or more application servers, or one or more access and mobility management functions (AMFs), among other examples. In some aspects, the UE 120, a first network node 110, and a second network node 110, of the multiple network nodes, may be part of a wireless network (for example, the wireless network 100). In other examples, the first network node 110 and the second network node 110 may be part of different wireless networks. In some aspects, the first network node 110 may be referred to as a first cell and the second network node 110 may be referred to as a second cell. In some aspects, a single network node (for example, a core network node, a DU or a CU) may perform control functions associated with the first network node 110 and the second network node 110.

In some aspects, the first network node 110 may be operating in a first operating mode, such as the active mode 504. For example, the first network node 110 may be transmitting reference signals, such as SIBs or SSB, in accordance with a periodicity that is defined, or otherwise fixed, by a wireless communication standard, such as the 3GPP (for example, for normal operation or operation in the active mode). The second network node 110 may be operating in a second operating mode, such as the energy saving mode 502. For example, the second network node 110 may not be transmitting certain reference signals, such as SIBs or SSB, among other examples. In some other aspects, the second network node 110 may be transmitting the certain reference signals, such as SIBS or SSBs, at a greater periodicity (for example, less frequently) than a periodicity at which the first network node 110 is transmitting the reference signals. In some aspects, the second network node 110 may be a simplified discovery signal, such as a downlink keep-alive signal (for example, as described in more detail elsewhere herein, such as in connection with FIG. 5), rather than transmitting SIBs or SSBs. In some other aspects, the second network node 110 may be operating in a listen mode in which the second network node 110 is not transmitting any signals, but is monitoring for certain signals. In some other aspects, the second network node 110 may not be transmitting any signals and may not be monitoring physical channels associated with the UE 120 (for example, but may be monitoring other communication interfaces for communicating with network nodes, such as with the first network node 110). These techniques may enable the second network node 110 to conserve power, as described elsewhere herein.

In a first operation 705, the first network node 110 or the second network node 110 may transmit, and the UE 120 may receive, configuration information. In some aspects, the UE 120 may receive the configuration information via one or more of system information (for example, one or more SIBs), RRC signaling, one or more medium access control (MAC) control elements (MAC-CEs), or downlink control information (DCI), among other examples. In some aspects, the configuration information may indicate RMSI associated with the first network node 110 or the second network node 110. In some aspects, the configuration information may indicate information associated with discovery signals, such as downlink keep-alive signals, that are to be transmitted by the second network node 110.

The UE may configure itself based at least in part on the configuration information. In some aspects, the UE may be configured to perform one or more operations described herein based at least in part on the configuration information.

In a second operation 710, the UE 120 may operate in an idle or an inactive mode. For example, the UE 120 may operate in an RRC idle or an RRC inactive mode. In other words, the UE 120 may not have an established connection (for example, an RRC connection) with any network nodes, such as the first network node 110 or the second network node 110. For example, the UE 120 may transition between different modes based at least in part on various commands or communications received from the one or more network nodes 110. For example, the UE 120 may transition from RRC active mode or RRC inactive mode to RRC idle mode based at least in part on receiving an RRCRelease communication. As another example, the UE 120 may transition from RRC active mode to RRC inactive mode based at least in part on receiving an RRCRelease with suspendConfig communication. As another example, the UE 120 may transition from RRC idle mode to RRC active mode based at least in part on receiving an RRCSetupRequest communication. As another example, the UE 120 may transition from RRC inactive mode to RRC active mode based at least in part on receiving an RRCResumeRequest communication.

When transitioning to RRC inactive mode, the UE or the one or more network nodes 110 may store a UE context (for example, an access stratum (AS) context or higher-layer configurations). This permits the UE 120 or the one or more network nodes 110 to apply the stored UE context when the UE transitions from RRC inactive mode to RRC active mode in order to resume communications with the one or more network nodes 110, which reduces latency of transitioning to RRC active mode relative to transitioning to the RRC active mode from RRC idle mode. As part of the second operation 710, the UE 120 may monitor resources associated with SIBs, SSBs, discovery signals, or keep-alive signals transmitted by network nodes 110, such as the first network node 110 or the second network node 110. The UE 120 may measure signals received while operating in the idle or inactive mode.

The UE 120 may be camped on a cell associated with the first network node 110. For example, the UE 120 may monitor a control channel of a first cell associated with the first network node 110 based at least in part on the first cell (for example, the first network node 110) operating in an active mode. A UE that has selected a cell and that is monitoring the control channel of the cell is said to be "camped" on the cell. In some aspects, the UE 120 may be restricted or barred from camping on a cell that is associated with the second network node 110. For example, the UE 120 may refrain from selecting the second cell or from monitoring a control channel associated with the second cell based at least in part on the second cell being barred for camping. In other words, cells or network nodes that are operating in the energy saving mode may not be used by the UE for camping. In some aspects, the configuration information may indicate that the cell(s) associated with the second network node 110 are barred (for example, for camping) because the second network node 110 is operating in the energy saving mode. In some aspects, a rule may be defined (for example, by a wireless communication standard, such as the 3GPP) that indicates that cells that are operating in an energy saving mode are not permitted to be camped on by UEs.

This may enable the second network node 110 to conserve power. For example, if UEs were allowed to select or camp on a cell associated with the second network node 110 (for example, while the cell or the second network node 110 is operating in the energy saving mode), then the cell associated with the second network node 110 may be required to transmit discovery signals, SSBs, or RMSI for the UE(s) camping on the cell. This may consume significant power of the network node 110 associated with transmitting the signals. Although described herein in connection with the energy saving mode, the UE 120 may similarly be barred from camping on any cell or frequency band in a similar manner. The UE 120 may be enabled to establish an RRC connection with the cell or the second network node 110, such as by transmitting an uplink signal to the cell as described in more detail elsewhere herein. In other words, the UE 120 may be barred from camping on cell(s) associated with the second network node 110, but the UE 120 may be allowed to establish an RRC connection with a cell associated with the second network node 110 (for example, if the UE 120 has uplink traffic to transmit).

In some aspects, in a third operation 715, the UE 120 may receive, and the second network node 110 may transmit, one or more discovery signals. In some aspects, the one or more discovery signals may be downlink keep-alive signals, as described in more detail in connection with FIG. 5. In some other aspects, the one or more discovery signals may be SSBs or SIBs, among other examples (for example, that are transmitted less frequently than if the second network node 110 were operating in the active mode). The second network node 110 may transmit the one or more discovery signals in accordance with a periodic schedule (for example, as defined by the energy saving mode).

In a fourth operation 720, the UE 120 may measure the one or more discovery signals. For example, the UE 120 may measure discovery signals received by the UE 120 from cells that are operating in an energy saving mode, such as a cell associated with the second network node 110. In some aspects, the UE 120 may receive a measurement configuration associated with performing the measurements associated with one or more cells operating in the energy saving mode. For example, the measurement configuration may be included in the configuration information. The measurement configuration may indicate one or more measurement resources or measurement objects that are to be measured by the UE 120 for performing measurements associated with one or more cells operating in the energy saving mode. For example, the one or more measurement resources or measurement objects may be associated with discovery signals or keep-alive signals transmitted by the second network node 110 (or another network node operating in the energy saving mode).

In some aspects, the UE 120 may store information associated with the one or more measurements. For example, the UE 120 may store measurement values (for example, RSRP values, RSRQ values, RSSI values, among other examples) associated with the measurement values. Additionally, the UE 120 may store identifying information associated with the one or more measurements. For example, because a discovery signal transmitted by the second network node 110 may not include an identifier of a cell (for example, a cell identifier or a PCI), the UE 120 may store other information to identify the one or more measurements. For example, for a given measurement, the UE 120 may store an indication of an identifier of a discovery signal associated with the measurement or an indication of time-frequency resources (for example, a measurement resource or a measurement object) associated with the measurement, among other examples. This information may enable the UE 120 to identify the one or more measurements at a later time. For example, because the UE 120 may be operating in an RRC idle or RRC inactive mode, the UE 120 may not have an active RRC connection. Therefore, the UE 120 may not be connected with a network node (for example, to which the UE 120 would otherwise report the one or more measurements). Therefore, the UE 120 may store the information associated with the one or more measurements to facilitate reporting the information after the UE 120 establishes an RRC connection with a network node.

In some aspects, in a fifth operation 725, the first network node 110 (or another network node) may transmit, and the second network node 110 may receive, an indication to monitor uplink resources associated with the UE 120. For example, the second network node 110 may receive an indication for a first cell (for example, an energy saving cell associated with the second network node 110) to monitor one or more time-frequency resources that are associated with a channel access procedure (for example, a RACH procedure) that is associated with the UE 120. For example, the RACH procedure may be associated with the UE and a second cell (for example, a cell operating in an active mode, such as a cell associated with the first network node 110).

For example, the second cell (for example, that is associated with the RACH procedure or the first network node 110) may have downlink traffic to transmit to the UE 120. A network node (for example, the first network node 110, a core network node, a CU, or a DU) may transmit a paging request to the second cell indicating that the second cell is to transmit a paging signal to the UE 120 to cause the UE 120 to initiate the RACH procedure with the second cell. For example, an information element of the paging request may indicate which energy saving cells should also monitor the RACH occasion in which the UE 120 is to respond to the paging signal. Additionally, the network node (for example, the first network node 110, a core network node, a CU, or a DU) may transmit an indication to one or more energy saving cells, such as the first cell associated with the second network node 110, to monitor or measure a corresponding RACH occasion in which the UE 120 may transmit a RACH communication in response to the paging signal. In other words, the paging signal may cause the UE 120 to transmit a RACH communication (for example, a msg1 or a msgA) to the second cell (for example, to the first network node 110). The network (for example, the first network node 110, a core network node, a CU, or a DU) may indicate, to one or more energy saving cells, such as the first cell associated with the second network node 110, to monitor or measure the time-frequency resources that will be used by the UE 120 to transmit the RACH communication. This may enable the network to identify cells, that are currently operating in an energy saving mode, that are located proximate to the UE 120 (for example, cells that are capable of receiving communications from the UE 120). In other words, if a cell is able to detect or measure the RACH communication transmitted by the UE 120, this may indicate that the UE 120 is within a coverage area of the cell (for example, and that the cell may be suitable to serve the UE 120).

For example, the one or more time-frequency resources may be associated with a RACH configuration that is associated with the second cell (for example, the one or more time-frequency resources may be associated with a RACH occasion). For example, the second network node 110 may receive an indication of the RACH configuration that is associated with the second cell. In some aspects, the indication of the RACH configuration may be included in the indication for the first cell to monitor the one or more time-frequency resources (for example, transmitted as part of the fifth operation 725). In other aspects, the indication of the RACH configuration may be provided separately from the indication for the first cell to monitor the one or more time-frequency resources. For example, the indication for the first cell to monitor the one or more time-frequency resources may indicate which cell is to transmit the paging signal. The second cell (for example, the second network node 110) may identify a RACH configuration associated with the cell and may monitor a RACH occasion associated with the RACH configuration.

In a sixth operation 730, the first network node 110 (for example, a cell associated with the first network node 110) may transmit, and the UE 120 may receive, a paging signal. The paging signal may indicate that the UE 120 is to establish a connection (for example, an RRC connection) with the first network node 110 (for example, with the cell associated with the first network node 110). For example, the paging signal may trigger the UE 120 to transmit a RACH configuration (for example, using the RACH occasion indicated by the RACH configuration associated with the first network node 110).

In some aspects, the UE 120 may transmit an uplink signal to trigger the energy saving cell to activate (for example, in an eleventh operation 755) based at least in part on receiving a paging signal (for example, the paging signal received by the UE 120 in the sixth operation 730 or a similar paging signal) that indicates that the UE 120 is to establish a connection with the energy saving cell. For example, the paging signal transmitted by an active cell (for example, a cell in an active mode associated with the first network node 110) may indicate that the UE 120 is to attempt to establish a connection (or is permitted to attempt to establish a connection) with the energy saving cell associated with the second network node 110. For example, based at least in part on one or more of the operations described herein, the network may determine that the energy saving cell is a candidate to serve the UE 120. Therefore, a paging request may indicate that the UE 120 is to, or is permitted to, attempt to establish a connection with a given energy saving cell. For example, the first network node 110 may transmit paging to the UE 120 to request that the UE establish an RRC connection with a neighboring cell (or one cell within a provided list).

In some aspects, the paging signal may indicate one or more configurations associated with the energy saving cell.

For example, the paging signal may indicate additional information (for example, in addition to a cell identifier or a PCI), such as an RRC configuration, a keep-alive signal configuration, an uplink trigger configuration, an SSB configuration, a channel state information (CSI) reference signal (CSI-RS) configuration, or a RACH configuration, among other examples, of the energy saving cell. This may enable the UE 120 to proactively obtain the configuration(s) associated with the energy saving cell. In such examples, the UE 120 may perform a channel access procedure with the second network node 110, rather than with the first network node 110 (for example, as described below). In other aspects, the paging signal may indicate that the UE 120 is to connect with the first network node 110.

In a seventh operation 735, the UE 120 may transmit, and the first network node 110 may receive, a communication (for example, a RACH communication) using the uplink resources (for example, the time-frequency resources) indicated by the RACH occasion. For example, the paging signal (such as the paging signal received by the UE 120 in the sixth operation 730) may indicate that the UE 120 is to connect with the first network node 110. For example, the UE 120 may transmit the RACH communication using the time-frequency resources that are being monitored by the one or more energy saving cells (such as a cell associated with the second network node 110).

In an eighth operation 740, the second network node 110 (for example, the energy saving cell associated with the second network node 110) may detect or measure the communication transmitted by the UE 120. For example, based at least in part on monitoring the time-frequency resources used by the UE 120, the second network node 110 may detect the RACH communication that is transmitted by the UE 120 to the first network node 110. In some aspects, the second network node 110 may measure the RACH communication to obtain one or more measurement values, such as RSRP values, RSRQ values, or RSSI values, among other examples.

In some aspects, the second network node 110 may perform one or more actions based at least in part on receiving, detecting, or measuring the RACH communication that is transmitted by the UE 120 to the first network node 110. For example, in some aspects, the one or more actions may include modifying a state of the energy saving mode of the cell (for example, of the first network node 110) based at least in part on detecting the RACH communication or on the one or more measurements satisfying a threshold. For example, modifying the state of the energy saving mode may include transitioning the cell or the second network node 110 to an active mode. As another example, modifying the state of the energy saving mode may include the second network node 110 initiating transmission of SSBs. For example, based at least in part on detecting the RACH communication or on the one or more measurements of the RACH communication satisfying a threshold, the second network node 110 may begin transmitting SSBs. As another example, modifying the state of the energy saving mode may include the second network node 110 modifying a periodicity at which SSBs are transmitted by the second network node 110. For example, based at least in part on detecting the RACH communication or on the one or more measurements of the RACH communication satisfying a threshold, the second network node 110 may begin transmitting SSBs more frequently (for example, to improve channel access or mobility for the UE 120). As another example, modifying the state of the energy saving mode may include the second network node 110 initiating a transmission of discovery signals or keep-alive signals. For example, if the network node 110 (or a cell associated with the network node 110) is in a listen mode (for example, is not transmitting any signals), the second network node 110 may begin transmitting signals (for example, discovery signals or keep-alive signals) based at least in part on detecting the RACH communication or on the one or more measurements of the RACH communication satisfying a threshold.

In some aspects, the one or more actions performed by the second network node 110 may be defined, or otherwise fixed, by a wireless communication standard, such as the 3GPP. Additionally or alternatively, the one or more actions performed by the second network node 110 may be negotiated with, or indicated by, the first network node 110 or another network node 110. For example, there may be a prior indication/coordination of the expected behavior of the monitoring cell (for example, under what conditions the cell should become more active, such as depending on any of the measurements of the RACH communications, or on one or more timers, among other examples).

In some aspects, the one or more actions performed by the second network node 110 may include reporting information associated with the detected RACH communication. For example, in a ninth operation 745, the second network node 110 may transmit a measurement report indicating the one or more measurements associated with one or more signals (for example, RACH communication(s)) detected or measured by a cell of the second network node 110. The report of the information associated with the detected RACH communication may include an indication of one or more measurement values, an SSB index associated with a RACH occasion (for example, in which the RACH communication was transmitted), a RACH occasion index associated with the RACH occasion, an index value associated with time-frequency resources used (for example, by the second network node 110) to measure the RACH communication, or uplink reception timing information (for example, timing offset information or reception timing values) associated with the UE 120, among other examples. In some aspects, the report may include an indication of a change in an operating mode of the energy saving cell (for example, a modification of a state of the energy saving mode or a new operating mode of the energy saving cell, as described in more detail elsewhere herein). For example, the report may indicate any change in the status of the energy saving cell upon monitoring the RACH occasions (for example, if the energy saving cell is to become active and transmit SSBs, among other examples).

In some aspects, the cell that transmitted the paging signal (for example, in the sixth operation 730) and the energy saving cell associated with the second network node 110 (for example, that is reporting the information in the ninth operation 745) may be associated with the same disaggregated RAN unit. In such examples, the second network node 110 (for example, an RU) may transmit the report of the information associated with the detected RACH communication to a DU or a CU associated with the disaggregated RAN unit. In other examples, the cell that transmitted the paging signal (for example, in the sixth operation 730) and the energy saving cell associated with the second network node 110 (for example, that is reporting the information in the ninth operation 745) may be associated with different disaggregated RAN units. In such examples, the second network node 110 (for example, an RU or a DU) may transmit the report of the information associated with the detected RACH communication to a DU or a CU associated with another disaggregated RAN unit.

In other examples, the cell that transmitted the paging signal (for example, in the sixth operation 730) and the energy saving cell associated with the second network node 110 (for example, that is reporting the information in the ninth operation 745) may be associated with different base stations. In such examples, the second network node 110 (for example, an RU or a DU) may transmit the report of the information associated with the detected RACH communication via an Xn interface communication. In some aspects, the second network node 110 (for example, an RU or a DU) may transmit the report of the information associated with the detected RACH communication to a core network node, such an AMF, among other examples.

The report of the information associated with the detected RACH communication may enable the network (for example, one or more network nodes) to identify energy saving cells that are candidates to be activated to serve the UE 120. For example, if the report indicates that an energy saving cell associated with the second network node 110 detected the RACH communication or that a measurement of the RACH communication (for example, performed by the energy saving cell) satisfies a threshold, then the energy saving cell may be a candidate cell to be activated to serve the UE 120. Conversely, if the report indicates that the energy saving cell associated with the second network node 110 did not detect the RACH communication or that a measurement of the RACH communication (for example, performed by the energy saving cell) does not satisfy the threshold, then the energy saving cell may not be a candidate cell to be activated to serve the UE 120. This may enable the network to narrow down a quantity of energy saving cells that are candidates to be activated to serve the UE 120. Additionally, this may reduce a likelihood that an energy saving cell that is not suitable to serve the UE 120 is activated from the energy saving mode for purposes of serving the UE 120, thereby conserving power of such energy saving cells.

In some aspects, in a tenth operation 750, the UE 120 may transmit, and the first network node 110 may receive, an indication of measurements associated with one or more cells operating in the energy saving mode. For example, the UE 120 may transmit a report of measurements performed by the UE 120, such as part of the fourth operation 720. For example, the UE 120 may store information associated with the measurements of discovery signals, such as keep-alive signals (for example, a signal transmitted in the third operation 715), that are received by the UE 120 from one or more energy saving cells (for example, the one or more cells operating in the energy saving mode). For example, the UE 120 may transmit the indication of measurements associated with one or more cells operating in the energy saving mode after establishing a connection (for example, an RRC connection) with the first network node 110. In other words, the UE 120, upon connecting to a cell, may report measurements associated with neighboring energy saving cells.

In some aspects, the indication of the measurements may include an indication of respective identifiers of discovery signals associated with the measurements. Additionally or alternatively, the indication of the measurements may include an indication of respective time-frequency resources associated with the measurements. For example, because the discovery signals may not include a cell identifier (for example, a PCI, unlike SSBs), the respective identifiers of discovery signals or the respective time-frequency resources may enable the network (for example, the first network node 110 or another network node) to identify cells associated with respective measurements reported by the UE 120.

In some aspects, the UE 120 may transmit a report of the measurements associated with the one or more cells operating in the energy saving mode based at least in part on indicating to the first network node 110 that the UE 120 has stored the information associated with the measurements. For example, the UE 120 may transmit (for example, to the first network node 110 or to a cell associated with the first network node 110) an indication that the UE is storing the measurements associated with the one or more cells operating in the energy saving mode. The UE 120 may receive (for example, from the first network node 110 or a cell associated with the first network node 110) a request to transmit the indication of the measurements. The UE 120 transmitting the indication of the measurements (for example, in the tenth operation 750) may be based at least in part on receiving the request. In some aspects, the indication that the UE 120 is storing the measurements is included in a connection establishment communication, such as a RACH communication or an RRC communication. For example, the UE 120 may indicate that the UE 120 has discovery signal measurements of energy saving cells to report when establishing the connection with the first network node 110.

In some aspects, the network (for example, the first network node 110 or a cell associated with the first network node 110) may transmit a request for any discovery signal measurements of energy saving cells stored by the UE 120. For example, the UE 120 may receive a request for measurements associated with cells operating in the energy saving mode (for example, preemptively without the UE 120 indicating that the UE 120 has performed the measurements). The UE 120 transmitting the indication of the measurements (for example, in the tenth operation 750) may be based at least in part on receiving the request. In some aspects, the UE 120 may proactively transmit the indication of the measurements (for example, in the tenth operation 750) (for example, without receiving a request from the network). For example, the UE 120 may receive an indication of uplink resources based at least in part on establishing a connection with the first network node 110. For example, the UE 120 may transmit a scheduling request based at least in part on the UE 120 having the measurements to report. The UE 120 may receive allocated uplink resources based at least in part on transmitting the scheduling request. The UE 120 may transmit the indication of the measurements (for example, in the tenth operation 750) using the uplink resources. For example, the UE 120 may provide an early indication during the connection setup process of the discovery signal measurements of energy saving cells stored by the UE 120.

The report of the discovery signal measurements of energy saving cells stored by the UE 120 may enable the network (for example, one or more network nodes) to identify energy saving cells that are candidates to be activated to serve the UE 120. For example, if a measurement of an energy saving cell (for example, performed by the UE 120) satisfies a threshold, then the energy saving cell may be a candidate to serve the UE 120. Conversely, if the measurement of the energy saving cell (for example, performed by the UE 120) does not satisfy the threshold, then the energy saving cell may not be a candidate to serve the UE 120. This may enable the network to narrow down a quantity of energy saving cells that are candidates to be activated to serve the UE 120. Additionally, this may reduce a likelihood that an energy saving cell that is not suitable to serve the UE 120 is activated from the energy saving mode for purposes of serving the UE 120, thereby conserving power of such energy saving cells.

In an eleventh operation 755, the UE 120 may transmit, and the second network node 110 (or an energy saving cell associated with the second network node 110) may receive, a signal (for example, a communication) associated with establishing a connection with the energy saving cell that is associated with the second network node 110. As described elsewhere herein, the UE 120 may be barred from camping on the energy saving cell associated with the second network node 110 (for example, to limit a quantity of signals transmitted by the energy saving cell for idle or inactive UEs). However, in some cases, the UE 120 may be enabled to select the energy saving cell to initiate an RRC connection (for example, to transmit uplink traffic). For example, the UE 120 may determine that the UE 120 is to establish a connection (for example, an RRC connection), such as due to uplink traffic arriving at the UE 120. In other words, even though the UE 120 is barred from camping on the energy saving cell (or another cell), the UE 120 may be enabled to initiate a connection with the energy saving cell (or another cell). For example, while operating in the idle or inactive mode, the UE 120 may camp on the cell associated with the first network node 110 (for example, because that cell is associated with the active mode). However, when the UE 120 transitions to an RRC connected mode, the UE 120 may select the energy saving cell associated with the second network node to establish the RRC connection.

In some aspects, the UE 120 may transmit an uplink signal to trigger the energy saving cell to activate (for example, to transition to an active mode to enable the UE 120 to establish an RRC connection with the cell) based at least in part on one or more conditions being met. In some aspects, the one or more conditions may be indicated by system information, the configuration information, an RRC configuration (for example, of the first network node 110), an SIB or MIB (for example, transmitted by the energy saving cell), or by a wireless communication standard, such as the 3GPP, among other examples.

For example, the one or more conditions may include a measurement threshold. For example, if a measurement value of the energy saving cell satisfies the measurement threshold (for example, that is defined for enabling UEs to wake up and connect with energy saving cells), then the UE 120 may transmit the uplink signal to trigger the energy saving cell to activate (for example, in the eleventh operation 755). In some aspects, the measurement threshold may be a value (for example, an absolute value), such as X decibels. In some other aspects, the measurement threshold may be a differential value relative to a measurement value associated with an active cell, such as a cell associated with the first network node 110. For example, the UE 120 may transmit the uplink signal to trigger the energy saving cell to activate (for example, in the eleventh operation 755) based at least in part on a measurement value of the energy saving cell being L decibels greater than a measurement value of the active cell. In some aspects, the one or more thresholds may be associated with one or more timers. For example, the UE 120 may transmit the uplink signal to trigger the energy saving cell to activate (for example, in the eleventh operation 755) based at least in part on the one or more measurements of the energy saving cell satisfying the measurement threshold for an amount of time (for example, the amount of time associated with a timer).

In a twelfth operation 760, the energy saving cell (for example, associated with the second network node 110) may transition to an active mode (for example, based at least in part on receiving the signal or communication from the UE 120 in the eleventh operation 755). The UE 120 and the cell (for example, that is now an active cell) may establish an RRC connection. The UE 120 and the cell may exchange one or more communications. As a result, time, processing resources, power resources, or signaling overhead that would have otherwise been used to perform RRM procedures to identify the other network nodes or cells may be conserved. Additionally, this may conserve power resources of a network node by improving a likelihood that another network node (for example, that is not suitable to serve the UE 120) is able to remain in the energy saving mode. In other words, a determination as to which network nodes or which cells are to be activated (for example, from an energy saving mode) to serve the UE 120 may be improved.

Figure 8:
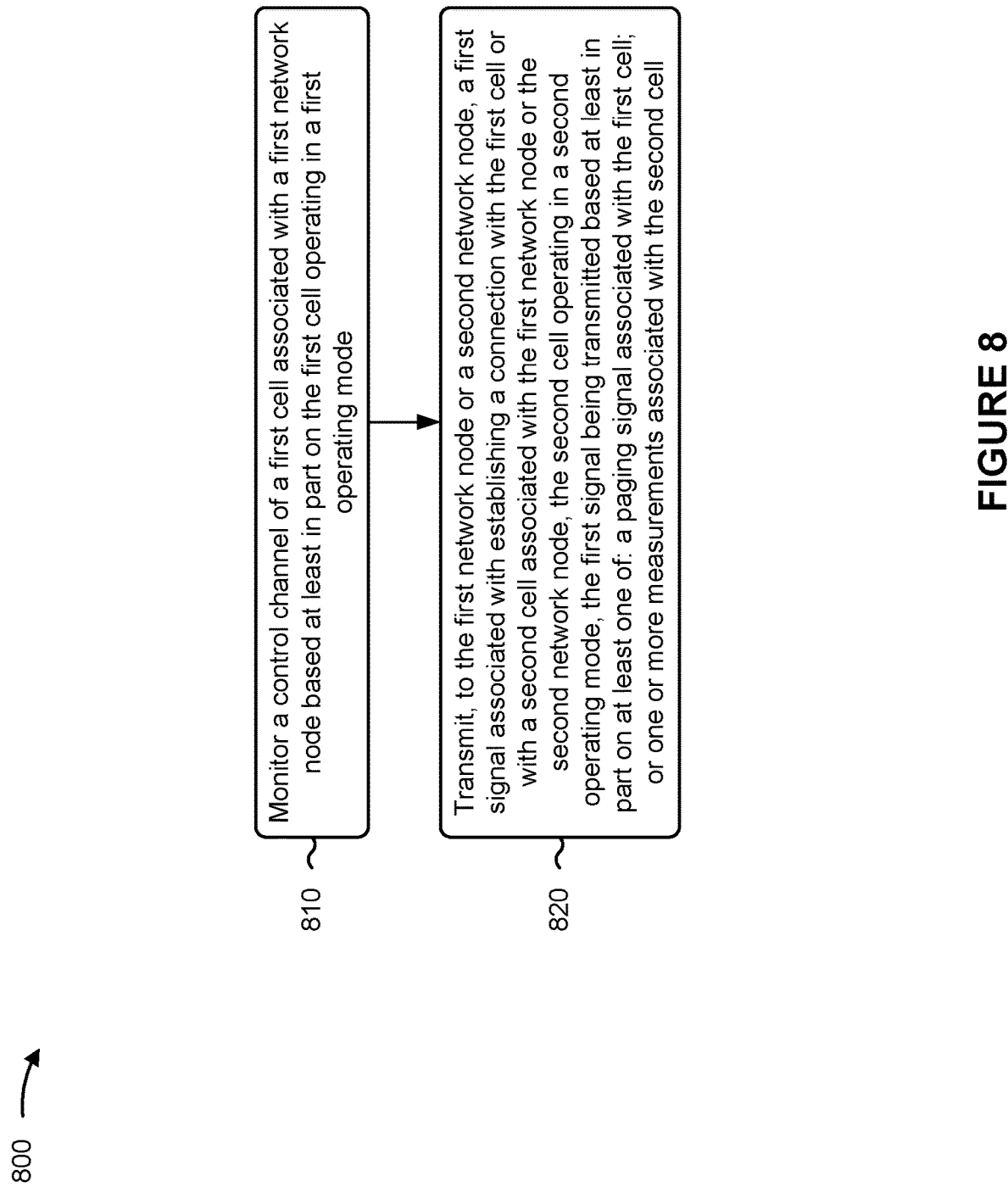
FIG. 8 is a flowchart illustrating an example process performed, for example, by a UE, associated with access control for network energy savings, in accordance with the present disclosure.

FIG. 8 is a flowchart illustrating an example process 800 performed, for example, by a UE in accordance with the present disclosure. Example process 800 is an example where the UE (for example, the UE 120) performs operations associated with access control for network energy savings.

As shown in FIG. 8, in some aspects, process 800 may include monitoring a control channel of a first cell associated with a first network node based at least in part on the first cell operating in a first operating mode (block 810). For example, the UE (such as by using communication manager 140 or monitoring component 1108, depicted in FIG. 11) may monitor a control channel of a first cell associated with a first network node based at least in part on the first cell operating in a first operating mode, as described above.

As further shown in FIG. 8, in some aspects, process 800 may include transmitting, to the first network node or a second network node, a first signal associated with establishing a connection with the first cell or with a second cell associated with the first network node or the second network node, the second cell operating in a second operating mode, the first signal being transmitted based at least in part on at least one of: a paging signal associated with the first cell, or one or more measurements associated with the second cell (block 820). For example, the UE (such as by using communication manager 140 or transmission component 1104, depicted in FIG. 11) may transmit, to the first network node or a second network node, a first signal associated with establishing a connection with the first cell or with a second cell associated with the first network node or the second network node, the second cell operating in a second operating mode, the first signal being transmitted based at least in part on at least one of: a paging signal associated with the first cell, or one or more measurements associated with the second cell, as described above.

Process 800 may include additional aspects, such as any single aspect or any combination of aspects described below or in connection with one or more other processes described elsewhere herein.

In a first additional aspect, process 800 includes receiving, from the second cell, one or more discovery signals, where the one or more measurements are based at least in part on the one or more discovery signals.

In a second additional aspect, alone or in combination with the first aspect, transmitting the first signal include transmitting the first signal to the first cell, and process 800 includes transmitting, to the first cell, an indication of measurements associated with one or more cells operating in the second operating mode, the measurements including the one or more measurements associated with the second cell.

In a third additional aspect, alone or in combination with one or more of the first and second aspects, the indication of the measurements includes an indication of at least one of respective identifiers of discovery signals associated with the measurements, or respective time-frequency resources associated with the measurements.

In a fourth additional aspect, alone or in combination with one or more of the first through third aspects, process 800 includes transmitting, to the first cell, an indication that the UE is storing the measurements associated with the one or more cells operating in the second operating mode, and receiving, from the first cell, a request to transmit the indication of the measurements, where transmitting the indication of the measurements is based at least in part on receiving the request.

In a fifth additional aspect, alone or in combination with one or more of the first through fourth aspects, the indication that the UE is storing the measurements is included in the first signal.

In a sixth additional aspect, alone or in combination with one or more of the first through fifth aspects, process 800 includes receiving, from the first cell, a request for measurements associated with cells operating in the second operating mode, where transmitting the indication of the measurements is based at least in part on receiving the request.

In a seventh additional aspect, alone or in combination with one or more of the first through sixth aspects, process 800 includes receiving, from the first cell, an indication of uplink resources based at least in part on establishing a connection with the first cell, where the indication of the measurements is transmitted using the uplink resources.

In an eighth additional aspect, alone or in combination with one or more of the first through seventh aspects, process 800 includes receiving a measurement configuration associated with performing the measurements associated with one or more cells operating in the second operating mode.

In a ninth additional aspect, alone or in combination with one or more of the first through eighth aspects, process 800 includes refraining from selecting the second cell or from monitoring a control channel associated with the second cell prior to transmitting the first signal based at least in part on the second cell being barred for camping.

In a tenth additional aspect, alone or in combination with one or more of the first through ninth aspects, transmitting the first signal includes transmitting the first signal to the second cell based at least in part on the one or more measurements associated with the second cell.

In an eleventh additional aspect, alone or in combination with one or more of the first through tenth aspects, the first signal triggers the second cell to transition from the second operating mode to the first operating mode.

In a twelfth additional aspect, alone or in combination with one or more of the first through eleventh aspects, transmitting the first signal is based at least in part on the one or more measurements satisfying a threshold, where the threshold is associated with at least one of a value, or a differential value from a measurement value associated with the first cell.

In a thirteenth additional aspect, alone or in combination with one or more of the first through twelfth aspects, transmitting the first signal is based at least in part on the one or more measurements satisfying the threshold for an amount of time.

In a fourteenth additional aspect, alone or in combination with one or more of the first through thirteenth aspects, process 800 includes receiving, from the first cell, the paging signal, where the paging signal indicates that the UE is to establish a connection with the second cell, and transmitting the first signal includes transmitting the first signal to the second cell based at least in part on receiving the paging signal.

In a fifteenth additional aspect, alone or in combination with one or more of the first through fourteenth aspects, the paging signal indicates one or more configurations associated with the second cell.

In a sixteenth additional aspect, alone or in combination with one or more of the first through fifteenth aspects, the first operating mode is an active mode and the second operating mode is an energy saving mode.

Although FIG. 8 shows example blocks of process 800, in some aspects, process 800 may include additional blocks, fewer blocks, different blocks, or differently arranged blocks than those depicted in FIG. 8. Additionally or alternatively, two or more of the blocks of process 800 may be performed in parallel.

Figure 9:
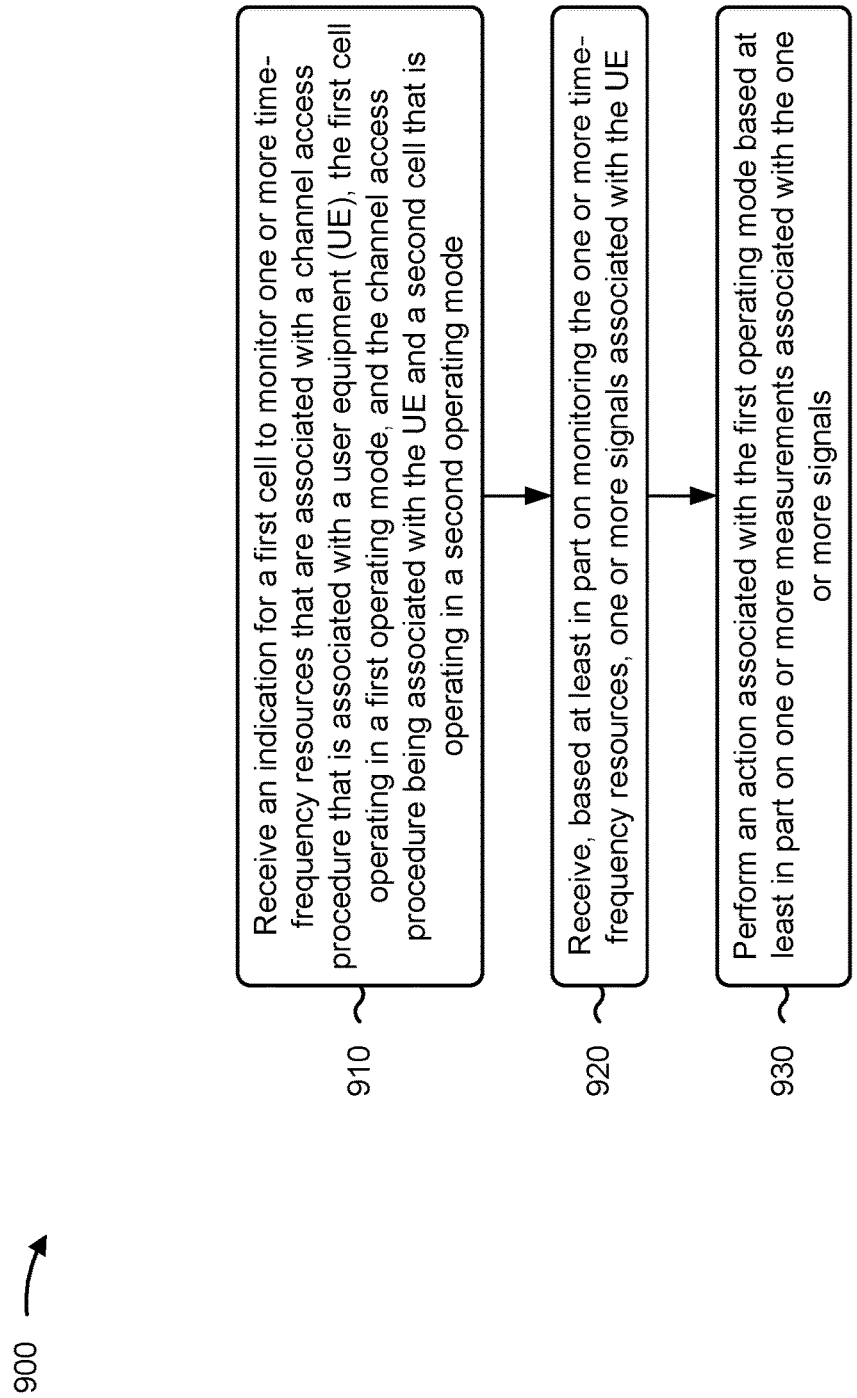
FIG. 9 is a flowchart illustrating an example process performed, for example, by a first network node, associated with access control for network energy savings, in accordance with the present disclosure.

FIG. 9 is a flowchart illustrating an example process 900 performed, for example, by a first network node in accordance with the present disclosure. Example process 900 is an example where the first network node (for example, a network node 110 or the second network node 110) performs operations associated with access control for network energy savings.

As shown in FIG. 9, in some aspects, process 900 may include receiving an indication for a first cell to monitor one or more time-frequency resources that are associated with a channel access procedure that is associated with a UE, the first cell operating in a first operating mode, and the channel access procedure being associated with the UE and a second cell that is operating in a second operating mode (block 910). For example, the first network node (such as by using communication manager 150 or reception component 1202, depicted in FIG. 12) may receive an indication for a first cell to monitor one or more time-frequency resources that are associated with a channel access procedure that is associated with a UE, the first cell operating in a first operating mode, and the channel access procedure being associated with the UE and a second cell that is operating in a second operating mode, as described above.

As further shown in FIG. 9, in some aspects, process 900 may include receiving, based at least in part on monitoring the one or more time-frequency resources, one or more signals associated with the UE (block 920). For example, the first network node (such as by using communication manager 150 or reception component 1202, depicted in FIG. 12) may receive, based at least in part on monitoring the one or more time-frequency resources, one or more signals associated with the UE, as described above.

As further shown in FIG. 9, in some aspects, process 900 may include performing an action associated with the first operating mode based at least in part on one or more measurements associated with the one or more signals (block 930). For example, the first network node (such as by using communication manager 150 or energy saving management component 1208, depicted in FIG. 12) may perform an action associated with the first operating mode based at least in part on one or more measurements associated with the one or more signals, as described above.

Process 900 may include additional aspects, such as any single aspect or any combination of aspects described below or in connection with one or more other processes described elsewhere herein.

In a first additional aspect, the one or more time-frequency resources are associated with a RACH configuration that is associated with the second cell.

In a second additional aspect, alone or in combination with the first aspect, process 900 includes receiving an indication of the RACH configuration that is associated with the second cell.

In a third additional aspect, alone or in combination with one or more of the first and second aspects, the indication of the RACH configuration is included in the indication for the first cell to monitor the one or more time-frequency resources.

In a fourth additional aspect, alone or in combination with one or more of the first through third aspects, the one or more signals are in response to a paging signal associated with the second cell.

In a fifth additional aspect, alone or in combination with one or more of the first through fourth aspects, performing the action includes transmitting a measurement report indicating the one or more measurements associated with the one or more signals.

In a sixth additional aspect, alone or in combination with one or more of the first through fifth aspects, the measurement report indicates a change in an operating mode of the first cell.

In a seventh additional aspect, alone or in combination with one or more of the first through sixth aspects, performing the action includes modifying a state of the first operating mode based at least in part on the one or more measurements satisfying a threshold.

In an eighth additional aspect, alone or in combination with one or more of the first through seventh aspects, modifying the state of the first operating mode includes at least one of initiating transmission of SSBs, or modifying a periodicity at which SSBs are transmitted.

In a ninth additional aspect, alone or in combination with one or more of the first through eighth aspects, the first operating mode is an energy saving mode and the second operating mode is an active mode.

Although FIG. 9 shows example blocks of process 900, in some aspects, process 900 may include additional blocks, fewer blocks, different blocks, or differently arranged blocks than those depicted in FIG. 9. Additionally or alternatively, two or more of the blocks of process 900 may be performed in parallel.

Figure 10:
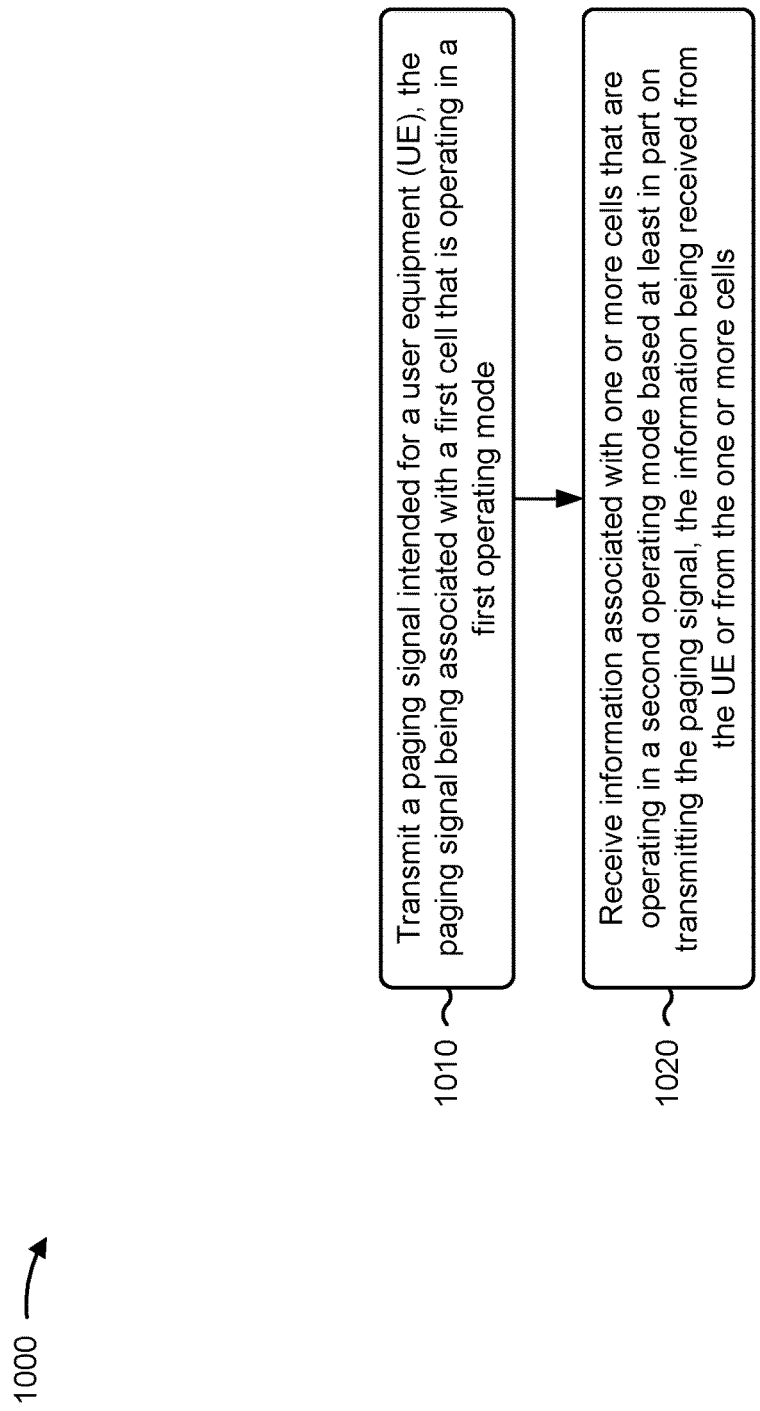
FIG. 10 is a flowchart illustrating an example process performed, for example, by a first network node, associated with access control for network energy savings, in accordance with the present disclosure.

FIG. 10 is a flowchart illustrating an example process 1000 performed, for example, by a first network node in accordance with the present disclosure. Example process 1000 is an example where the first network node (for example, a network node 110 or the first network node 110) performs operations associated with access control for network energy savings.

As shown in FIG. 10, in some aspects, process 1000 may include transmitting a paging signal intended for a UE, the paging signal being associated with a first cell that is operating in a first operating mode (block 1010). For example, the first network node (such as by using communication manager 150 or transmission component 1304, depicted in FIG. 13) may transmit a paging signal intended for a UE, the paging signal being associated with a first cell that is operating in a first operating mode, as described above.

As further shown in FIG. 10, in some aspects, process 1000 may include receiving information associated with one or more cells that are operating in a second operating mode based at least in part on transmitting the paging signal, the information being received from the UE or from the one or more cells (block 1020). For example, the first network node (such as by using communication manager 150 or reception component 1302, depicted in FIG. 13) may receive information associated with one or more cells that are operating in a second operating mode based at least in part on transmitting the paging signal, the information being received from the UE or from the one or more cells, as described above.

Process 1000 may include additional aspects, such as any single aspect or any combination of aspects described below or in connection with one or more other processes described elsewhere herein.

In a first additional aspect, process 1000 includes transmitting an indication for the one or more cells to monitor one or more time-frequency resources that are associated with a channel access procedure that is associated with the UE and the first cell, and receiving, via the one or more time-frequency resources, a RACH signal associated with the UE.

In a second additional aspect, alone or in combination with the first aspect, the information associated with the one or more cells is based at least in part on measurements of the RACH signal at the one or more cells.

In a third additional aspect, alone or in combination with one or more of the first and second aspects, the information associated with the one or more cells includes measurement reports associated with the one or more cells that indicate measurements of a RACH signal transmitted by the UE that are intended for the first cell.

In a fourth additional aspect, alone or in combination with one or more of the first through third aspects, the measurement reports include an indication of at least one of an index value associated with time-frequency resources used to measure the RACH signal, one or more measurement values of the RACH signal, or one or more reception timing values associated with the UE and the one or more cells.

In a fifth additional aspect, alone or in combination with one or more of the first through fourth aspects, the information associated with the one or more cells includes an indication of measurements performed by the UE and associated with the one or more cells.

In a sixth additional aspect, alone or in combination with one or more of the first through fifth aspects, the indication of the measurements includes an indication of at least one of respective identifiers of discovery signals associated with the measurements, or respective time-frequency resources associated with the measurements.

In a seventh additional aspect, alone or in combination with one or more of the first through sixth aspects, process 1000 includes receiving an indication that the UE is storing the measurements associated with the one or more cells operating in the second operating mode, and transmitting a request for the UE to transmit the indication of the measurements, where receiving the indication of the measurements is based at least in part on transmitting the request.

In an eighth additional aspect, alone or in combination with one or more of the first through seventh aspects, process 1000 includes transmitting a request for the UE to transmit an indication of measurements associated with cells operating in the second operating mode, where receiving the indication of the measurements is based at least in part on receiving the request.

In a ninth additional aspect, alone or in combination with one or more of the first through eighth aspects, process 1000 includes transmitting an indication of uplink resources for the UE based at least in part on establishing a connection with the UE via the first cell, where the indication of the measurements is received using the uplink resources.

In a tenth additional aspect, alone or in combination with one or more of the first through ninth aspects, process 1000 includes transmitting a measurement configuration intended for the UE associated with performing the measurements associated with the one or more cells operating in the second operating mode.

In an eleventh additional aspect, alone or in combination with one or more of the first through tenth aspects, the paging signal indicates that the UE is to establish a connection with a second cell, from the one or more cells, based at least in part on measurements of the one or more cells.

In a twelfth additional aspect, alone or in combination with one or more of the first through eleventh aspects, the paging signal indicates one or more configurations associated with the second cell.

In a thirteenth additional aspect, alone or in combination with one or more of the first through twelfth aspects, the first operating mode is an active mode and the second operating mode is an energy saving mode.

Although FIG. 10 shows example blocks of process 1000, in some aspects, process 1000 may include additional blocks, fewer blocks, different blocks, or differently arranged blocks than those depicted in FIG. 10. Additionally or alternatively, two or more of the blocks of process 1000 may be performed in parallel.

Figure 11:
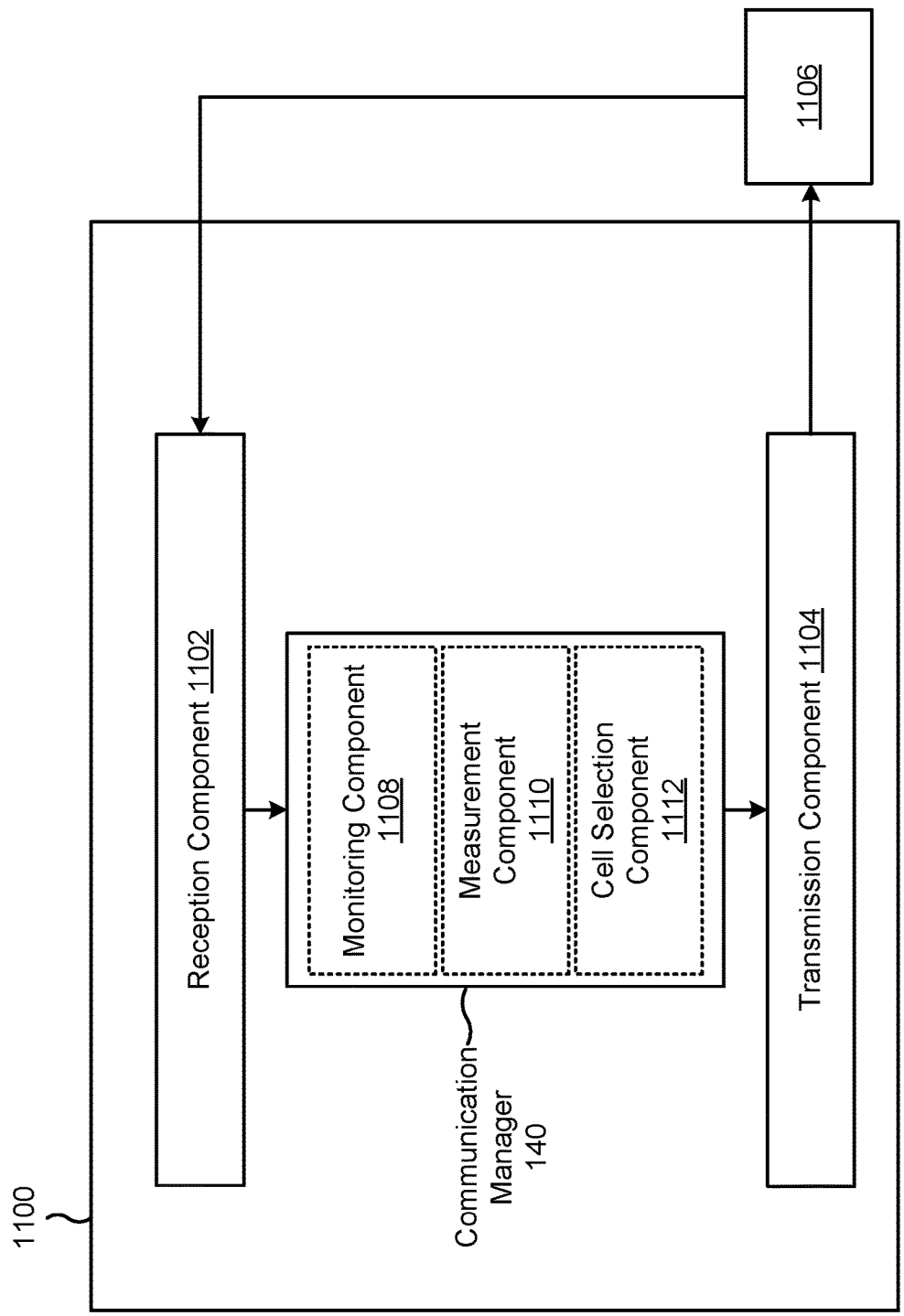
FIG. 11 is a diagram of an example apparatus for wireless communication in accordance with the present disclosure.

FIG. 11 is a diagram of an example apparatus 1100 for wireless communication in accordance with the present disclosure. The apparatus 1100 may be a UE, or a UE may include the apparatus 1100. In some aspects, the apparatus 1100 includes a reception component 1102, a transmission component 1104, and a communication manager 140, which may be in communication with one another (for example, via one or more buses). As shown, the apparatus 1100 may communicate with another apparatus 1106 (such as a UE, a network node, or another wireless communication device) using the reception component 1102 and the transmission component 1104.

In some aspects, the apparatus 1100 may be configured to perform one or more operations described herein in connection with FIG. 7. Additionally or alternatively, the apparatus 1100 may be configured to perform one or more processes described herein, such as process 800 of FIG. 8, or a combination thereof. In some aspects, the apparatus 1100 may include one or more components of the UE described above in connection with FIG. 2.

The reception component 1102 may receive communications, such as reference signals, control information, data communications, or a combination thereof, from the apparatus 1106. The reception component 1102 may provide received communications to one or more other components of the apparatus 1100, such as the communication manager 140. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1102 may include one or more antennas, a modem, a demodulator, a MIMO detector, a receive processor, a controller/processor, a memory, or a combination thereof, of the UE described above in connection with FIG. 2.

The transmission component 1104 may transmit communications, such as reference signals, control information, data communications, or a combination thereof, to the apparatus 1106. In some aspects, the communication manager 140 may generate communications and may transmit the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described above in connection with FIG. 2. In some aspects, the transmission component 1104 may be co-located with the reception component 1102 in a transceiver.

The communication manager 140 may monitor a control channel of a first cell associated with a first network node based at least in part on the first cell operating in a first operating mode. The communication manager 140 may transmit or may cause the transmission component 1104 to transmit, to the first network node or a second network node, a first signal associated with establishing a connection with the first cell or with a second cell, the second cell being associated with the first network node or the second network node, and the second cell operating in a second operating mode, the first signal being transmitted based at least in part on at least one of: a paging signal associated with the first cell; or one or more measurements associated with the second cell. In some aspects, the communication manager 140 may perform one or more operations described elsewhere herein as being performed by one or more components of the communication manager 140.

The communication manager 140 may include a controller/processor, a memory, or a combination thereof, of the UE described above in connection with FIG. 2. In some aspects, the communication manager 140 includes a set of components, such as a monitoring component 1108, a measurement component 1110, a cell selection component 1112, or a combination thereof. Alternatively, the set of components may be separate and distinct from the communication manager 140. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The monitoring component 1108 may monitor a control channel of a first cell associated with a first network node based at least in part on the first cell operating in a first operating mode. The transmission component 1104 may transmit, to the first network node or a second network node, a first signal associated with establishing a connection with the first cell or with a second cell, the second cell being associated with the first network node or the second network node, and the second cell operating in a second operating mode, the first signal being transmitted based at least in part on at least one of: a paging signal associated with the first cell, or one or more measurements associated with the second cell.

The reception component 1102 may receive, from the second cell, one or more discovery signals, wherein the one or more measurements are based at least in part on the one or more discovery signals.

The measurement component 1110 may perform the one or more measurements.

The transmission component 1104 may transmit, to the first cell, an indication that the UE is storing the measurements associated with the one or more cells operating in the second operating mode.

The reception component 1102 may receive, from the first cell, a request to transmit the indication of the measurements, wherein transmitting the indication of the measurements is based at least in part on receiving the request.

The reception component 1102 may receive, from the first cell, a request for measurements associated with cells operating in the second operating mode, wherein transmitting the indication of the measurements is based at least in part on receiving the request.

The reception component 1102 may receive, from the first cell, an indication of uplink resources based at least in part on establishing a connection with the first cell, wherein the indication of the measurements is transmitted using the uplink resources.

The reception component 1102 may receive a measurement configuration associated with performing the measurements associated with one or more cells operating in the second operating mode.

The cell selection component 1112 may refrain from selecting the second cell or from monitoring a control channel associated with the second cell prior to transmitting the first signal based at least in part on the second cell being barred for camping.

The reception component 1102 may receive, from the first cell, the paging signal, wherein the paging signal indicates that the UE is to establish a connection with the second cell, and wherein transmitting the first signal comprises transmitting the first signal to the second cell based at least in part on receiving the paging signal.

The quantity and arrangement of components shown in FIG. 11 are provided as an example. In practice, there may be additional components, fewer components, different components, or differently arranged components than those shown in FIG. 11.

Furthermore, two or more components shown in FIG. 11 may be implemented within a single component, or a single component shown in FIG. 11 may be implemented as multiple, distributed components. Additionally or alternatively, a set of (one or more) components shown in FIG. 11 may perform one or more functions described as being performed by another set of components shown in FIG. 11.

Figure 12:
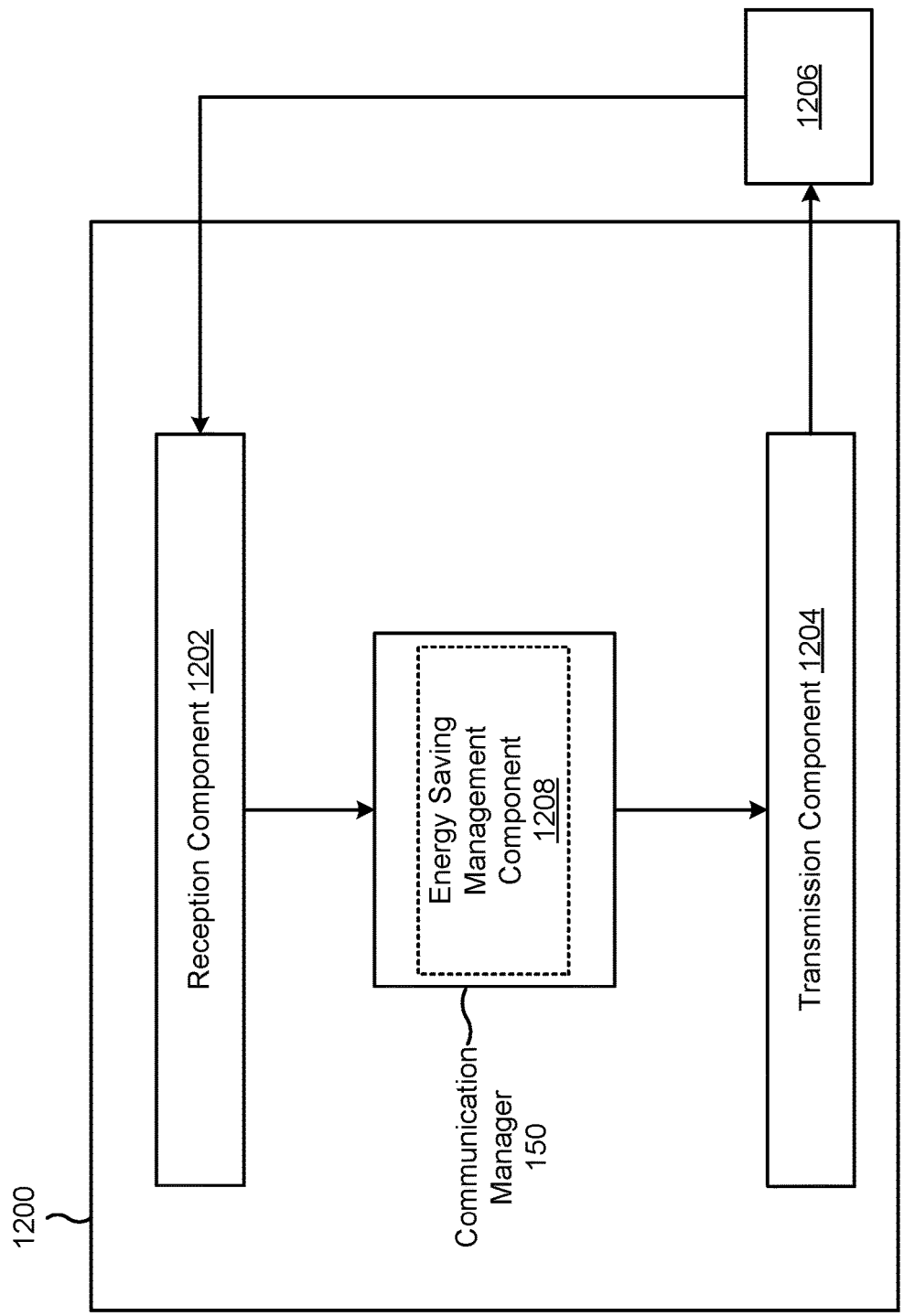
FIG. 12 is a diagram of an example apparatus for wireless communication in accordance with the present disclosure.

FIG. 12 is a diagram of an example apparatus 1200 for wireless communication in accordance with the present disclosure. The apparatus 1200 may be a network node, or a network node may include the apparatus 1200. In some aspects, the apparatus 1200 includes a reception component 1202, a transmission component 1204, and a communication manager 150, which may be in communication with one another (for example, via one or more buses). As shown, the apparatus 1200 may communicate with another apparatus 1206 (such as a UE, a network node, or another wireless communication device) using the reception component 1202 and the transmission component 1204.

In some aspects, the apparatus 1200 may be configured to perform one or more operations described herein in connection with FIG. 7. Additionally or alternatively, the apparatus 1200 may be configured to perform one or more processes described herein, such as process 900 of FIG. 9, or a combination thereof. In some aspects, the apparatus 1200 may include one or more components of the network node described above in connection with FIG. 2.

The reception component 1202 may receive communications, such as reference signals, control information, data communications, or a combination thereof, from the apparatus 1206. The reception component 1202 may provide received communications to one or more other components of the apparatus 1200, such as the communication manager 150. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1202 may include one or more antennas, a modem, a demodulator, a MIMO detector, a receive processor, a controller/processor, a memory, or a combination thereof, of the network node described above in connection with FIG. 2.

The transmission component 1204 may transmit communications, such as reference signals, control information, data communications, or a combination thereof, to the apparatus 1206. In some aspects, the communication manager 150 may generate communications and may transmit the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the network node described above in connection with FIG. 2. In some aspects, the transmission component 1204 may be co-located with the reception component 1202 in a transceiver.

The communication manager 150 may receive or may cause the reception component 1202 to receive an indication for a first cell to monitor one or more time-frequency resources that are associated with a channel access procedure that is associated with a UE, the first cell operating in a first operating mode, and the channel access procedure being associated with the UE and a second cell that is operating in a second operating mode. The communication manager 150 may receive or may cause the reception component 1202 to receive, based at least in part on monitoring the one or more time-frequency resources, one or more signals associated with the UE. The communication manager 150 may perform an action associated with the first operating mode based at least in part on one or more measurements associated with the one or more signals. In some aspects, the communication manager 150 may perform one or more operations described elsewhere herein as being performed by one or more components of the communication manager 150.

The communication manager 150 may include a controller/processor, a memory, a scheduler, a communication unit, or a combination thereof, of the network node described above in connection with FIG. 2. In some aspects, the communication manager 150 includes a set of components, such as an energy saving management component 1208, or a combination thereof. Alternatively, the set of components may be separate and distinct from the communication manager 150. In some aspects, one or more components of the set of components may include or may be implemented within a controller/processor, a memory, a scheduler, a communication unit, or a combination thereof, of the network node described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive an indication for a first cell to monitor one or more time-frequency resources that are associated with a channel access procedure that is associated with a UE, the first cell operating in a first operating mode, and the channel access procedure being associated with the UE and a second cell that is operating in a second operating mode. The reception component 1202 may receive, based at least in part on monitoring the one or more time-frequency resources, one or more signals associated with the UE. The energy saving management component 1208 may perform an action associated with the first operating mode based at least in part on one or more measurements associated with the one or more signals.

The reception component 1202 may receive an indication of the RACH configuration that is associated with the second cell.

The quantity and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally or alternatively, a set of (one or more) components shown in FIG. 12 may perform one or more functions described as being performed by another set of components shown in FIG. 12.

Figure 13:
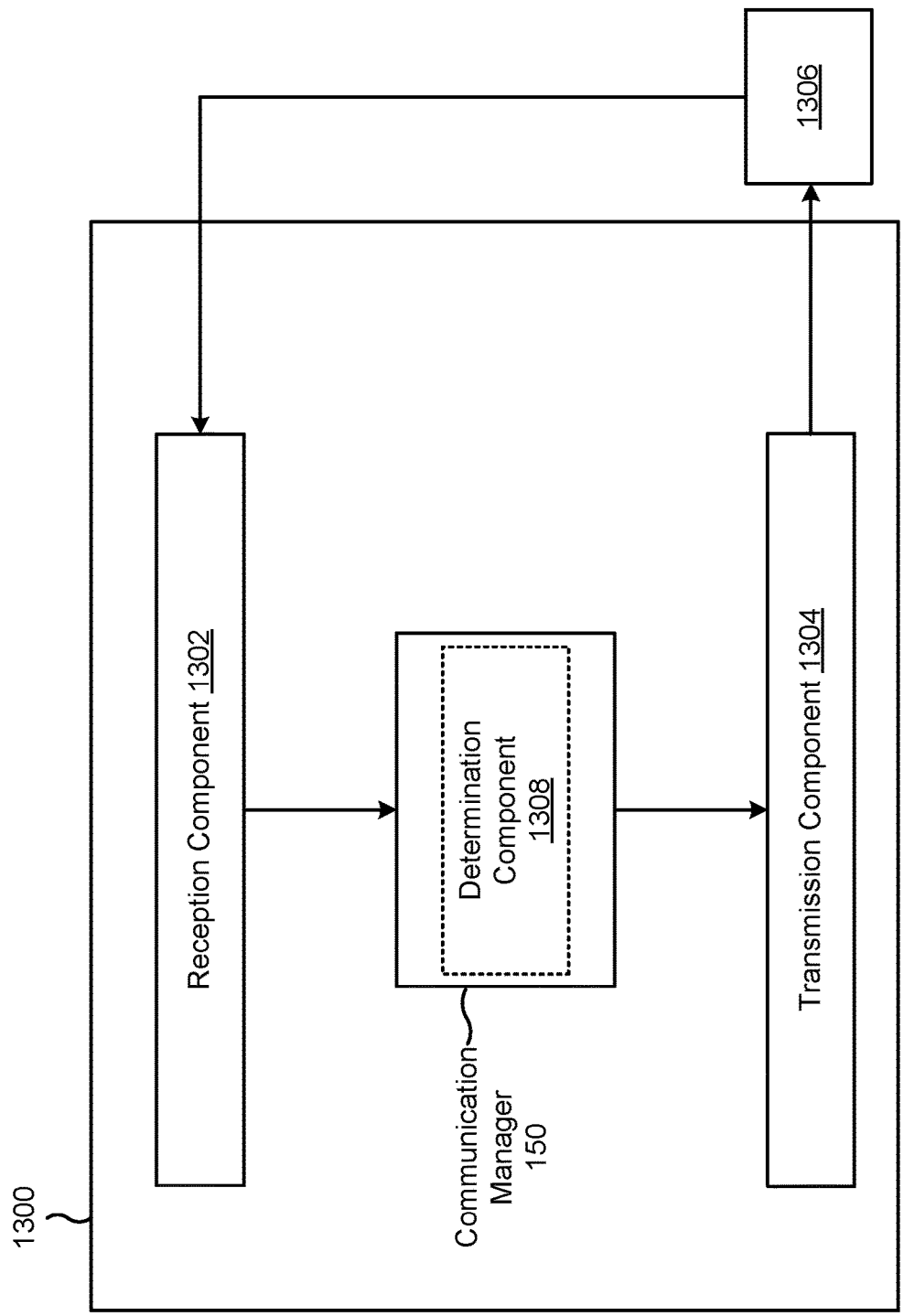
FIG. 13 is a diagram of an example apparatus for wireless communication in accordance with the present disclosure.

FIG. 13 is a diagram of an example apparatus 1300 for wireless communication in accordance with the present disclosure. The apparatus 1300 may be a network node, or a network node may include the apparatus 1300. In some aspects, the apparatus 1300 includes a reception component 1302, a transmission component 1304, and a communication manager 150, which may be in communication with one another (for example, via one or more buses). As shown, the apparatus 1300 may communicate with another apparatus 1306 (such as a UE, a network node, or another wireless communication device) using the reception component 1302 and the transmission component 1304.

In some aspects, the apparatus 1300 may be configured to perform one or more operations described herein in connection with FIG. 7. Additionally or alternatively, the apparatus 1300 may be configured to perform one or more processes described herein, such as process 1000 of FIG. 10, or a combination thereof. In some aspects, the apparatus 1300 may include one or more components of the network node described above in connection with FIG. 2.

The reception component 1302 may receive communications, such as reference signals, control information, data communications, or a combination thereof, from the apparatus 1306. The reception component 1302 may provide received communications to one or more other components of the apparatus 1300, such as the communication manager 150. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1302 may include one or more antennas, a modem, a demodulator, a MIMO detector, a receive processor, a controller/processor, a memory, or a combination thereof, of the network node described above in connection with FIG. 2.

The transmission component 1304 may transmit communications, such as reference signals, control information, data communications, or a combination thereof, to the apparatus 1306. In some aspects, the communication manager 150 may generate communications and may transmit the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the network node described above in connection with FIG. 2. In some aspects, the transmission component 1304 may be co-located with the reception component 1302 in a transceiver.

The communication manager 150 may transmit or may cause the transmission component 1304 to transmit a paging signal intended for a UE, the paging signal being associated with a first cell that is operating in a first operating mode. The communication manager 150 may receive or may cause the reception component 1302 to receive information associated with one or more cells that are operating in a second operating mode based at least in part on transmitting the paging signal, the information being received from the UE or from the one or more cells. In some aspects, the communication manager 150 may perform one or more operations described elsewhere herein as being performed by one or more components of the communication manager 150.

The communication manager 150 may include a controller/processor, a memory, a scheduler, a communication unit, or a combination thereof, of the network node described above in connection with FIG. 2. In some aspects, the communication manager 150 includes a set of components, such as a determination component 1308, or a combination thereof. Alternatively, the set of components may be separate and distinct from the communication manager 150. In some aspects, one or more components of the set of components may include or may be implemented within a controller/processor, a memory, a scheduler, a communication unit, or a combination thereof, of the network node described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The transmission component 1304 may transmit a paging signal intended for a UE, the paging signal being associated with a first cell that is operating in a first operating mode. The reception component 1302 may receive information associated with one or more cells that are operating in a second operating mode based at least in part on transmitting the paging signal, the information being received from the UE or from the one or more cells.

The determination component 1308 may determine at least one cell, from the one or more cells, that are suitable to serve the UE based at least in part on the information associated with the one or more cells.

The transmission component 1304 may transmit an indication for the one or more cells to monitor one or more time-frequency resources that are associated with a channel access procedure that is associated with the UE and the first cell.

The reception component 1302 may receive, via the one or more time-frequency resources, a RACH signal associated with the UE.

The reception component 1302 may receive an indication that the UE is storing the measurements associated with the one or more cells operating in the second operating mode.

The transmission component 1304 may transmit a request for the UE to transmit the indication of the measurements, wherein receiving the indication of the measurements is based at least in part on transmitting the request.

The transmission component 1304 may transmit a request for the UE to transmit an indication of measurements associated with cells operating in the second operating mode, wherein receiving the indication of the measurements is based at least in part on receiving the request.

The transmission component 1304 may transmit an indication of uplink resources for the UE based at least in part on establishing a connection with the UE via the first cell, wherein the indication of the measurements is received using the uplink resources.

The transmission component 1304 may transmit a measurement configuration intended for the UE associated with performing the measurements associated with the one or more cells operating in the second operating mode.

The quantity and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a user equipment (UE), comprising: monitoring a control channel of a first cell associated with a first network node based at least in part on the first cell operating in a first operating mode; and transmitting, to the first network node or a second network node, a first signal associated with establishing a connection with the first cell or with a second cell with the first network node or the second network node, the second cell operating in a second operating mode, the first signal being transmitted based at least in part on at least one of: a paging signal associated with the first cell; or one or more measurements associated with the second cell.

Aspect 2: The method of Aspect 1, further comprising: receiving, from the second cell, one or more discovery signals, wherein the one or more measurements are based at least in part on the one or more discovery signals.

Aspect 3: The method of any of Aspects 1-2, wherein transmitting the first signal comprises transmitting the first signal to the first cell, the method further comprising: transmitting, to the first cell, an indication of measurements associated with one or more cells operating in the second operating mode, the measurements including the one or more measurements associated with the second cell.

Aspect 4: The method of Aspect 3, wherein the indication of the measurements includes an indication of at least one of: respective identifiers of discovery signals associated with the measurements, or respective time-frequency resources associated with the measurements.

Aspect 5: The method of any of Aspects 3-4, further comprising: transmitting, to the first cell, an indication that the UE is storing the measurements associated with the one or more cells operating in the second operating mode; and receiving, from the first cell, a request to transmit the indication of the measurements, wherein transmitting the indication of the measurements is based at least in part on receiving the request.

Aspect 6: The method of Aspect 5, wherein the indication that the UE is storing the measurements is included in the first signal.

Aspect 7: The method of any of Aspects 3-6, further comprising: receiving, from the first cell, a request for measurements associated with cells operating in the second operating mode, wherein transmitting the indication of the measurements is based at least in part on receiving the request.

Aspect 8: The method of any of Aspects 3-7, further comprising: receiving, from the first cell, an indication of uplink resources based at least in part on establishing a connection with the first cell, wherein the indication of the measurements is transmitted using the uplink resources.

Aspect 9: The method of any of Aspects 3-8, further comprising: receiving a measurement configuration associated with performing the measurements associated with one or more cells operating in the second operating mode.

Aspect 10: The method of any of Aspects 1-9, further comprising: refraining from selecting the second cell or from monitoring a control channel associated with the second cell prior to transmitting the first signal based at least in part on the second cell being barred for camping.

Aspect 11: The method of Aspect 10, wherein transmitting the first signal comprises transmitting the first signal to the second cell based at least in part on the one or more measurements associated with the second cell.

Aspect 12: The method of Aspect 11, wherein the first signal triggers the second cell to transition from the second operating mode to the first operating mode.

Aspect 13: The method of any of Aspects 11-12, wherein transmitting the first signal is based at least in part on the one or more measurements satisfying a threshold, wherein the threshold is associated with at least one of: a value, or a differential value from a measurement value associated with the first cell.

Aspect 14: The method of Aspect 13, wherein transmitting the first signal is based at least in part on the one or more measurements satisfying the threshold for an amount of time.

Aspect 15: The method of any of Aspects 1-14, further comprising: receiving, from the first cell, the paging signal, wherein the paging signal indicates that the UE is to establish a connection with the second cell, and wherein transmitting the first signal comprises transmitting the first signal to the second cell based at least in part on receiving the paging signal.

Aspect 16: The method of Aspect 15, wherein the paging signal indicates one or more configurations associated with the second cell.

Aspect 17: The method of any of Aspects 1-16, wherein the first operating mode is an active mode and the second operating mode is an energy saving mode.

Aspect 18: A method of wireless communication performed by a first network node, comprising: receiving an indication for a first cell to monitor one or more time-frequency resources that are associated with a channel access procedure that is associated with a user equipment (UE), the first cell operating in a first operating mode, and the channel access procedure being associated with the UE and a second cell that is operating in a second operating mode; receiving, based at least in part on monitoring the one or more time-frequency resources, one or more signals associated with the UE; and performing an action associated with the first operating mode based at least in part on one or more measurements associated with the one or more signals.

Aspect 19: The method of Aspect 18, wherein the one or more time-frequency resources are associated with a random access channel (RACH) configuration that is associated with the second cell.

Aspect 20: The method of Aspect 19, further comprising: receiving an indication of the RACH configuration that is associated with the second cell.

Aspect 21: The method of Aspect 20, wherein the indication of the RACH configuration is included in the indication for the first cell to monitor the one or more time-frequency resources.

Aspect 22: The method of any of Aspects 18-21, wherein the one or more signals are in response to a paging signal associated with the second cell.

Aspect 23: The method of any of Aspects 18-22, wherein performing the action comprises: transmitting a measurement report indicating the one or more measurements associated with the one or more signals.

Aspect 24: The method of Aspect 23, wherein the measurement report indicates a change in an operating mode of the first cell.

Aspect 25: The method of any of Aspects 18-24, wherein performing the action comprises: modifying a state of the first operating mode based at least in part on the one or more measurements satisfying a threshold.

Aspect 26: The method of Aspect 25, wherein modifying the state of the first operating mode includes at least one of: initiating transmission of synchronization signal blocks (SSBs), or modifying a periodicity at which SSBs are transmitted.

Aspect 27: The method of any of Aspects 18-26, wherein the first operating mode is an energy saving mode and the second operating mode is an active mode.

Aspect 28: A method of wireless communication performed by a first network node, comprising: transmitting a paging signal intended for a user equipment (UE), the paging signal being associated with a first cell that is operating in a first operating mode; and receiving information associated with one or more cells that are operating in a second operating mode based at least in part on transmitting the paging signal, the information being received from the UE or from the one or more cells.

Aspect 29: The method of Aspect 28, further comprising: transmitting an indication for the one or more cells to monitor one or more time-frequency resources that are associated with a channel access procedure that is associated with the UE and the first cell; and receiving, via the one or more time-frequency resources, a random access channel (RACH) signal associated with the UE.

Aspect 30: The method of Aspect 29, wherein the information associated with the one or more cells is based at least in part on measurements of the RACH signal at the one or more cells.

Aspect 31: The method of any of Aspects 29-30, wherein the information associated with the one or more cells includes measurement reports associated with the one or more cells that indicate measurements of a random access channel (RACH) signal transmitted by the UE that are intended for the first cell.

Aspect 32: The method of Aspect 31, wherein the measurement reports include an indication of at least one of: an index value associated with time-frequency resources used to measure the RACH signal, one or more measurement values of the RACH signal, or one or more reception timing values associated with the UE and the one or more cells.

Aspect 33: The method of any of Aspects 29-32, wherein the information associated with the one or more cells includes an indication of measurements performed by the UE and associated with the one or more cells.

Aspect 34: The method of Aspect 33, wherein the indication of the measurements includes an indication of at least one of: respective identifiers of discovery signals associated with the measurements, or respective time-frequency resources associated with the measurements.

Aspect 35: The method of any of Aspects 33-34, further comprising: receiving an indication that the UE is storing the measurements associated with the one or more cells operating in the second operating mode; and transmitting a request for the UE to transmit the indication of the measurements, wherein receiving the indication of the measurements is based at least in part on transmitting the request.

Aspect 36: The method of any of Aspects 33-35, further comprising: transmitting a request for the UE to transmit an indication of measurements associated with cells operating in the second operating mode, wherein receiving the indication of the measurements is based at least in part on receiving the request.

Aspect 37: The method of any of Aspects 33-36, further comprising: transmitting an indication of uplink resources for the UE based at least in part on establishing a connection with the UE via the first cell, wherein the indication of the measurements is received using the uplink resources.

Aspect 38: The method of any of Aspects 33-37, further comprising: transmitting a measurement configuration intended for the UE associated with performing the measurements associated with the one or more cells operating in the second operating mode.

Aspect 39: The method of any of Aspects 28-38, wherein the paging signal indicates that the UE is to establish a connection with a second cell, from the one or more cells, based at least in part on measurements of the one or more cells.

Aspect 40: The method of Aspect 39, wherein the paging signal indicates one or more configurations associated with the second cell.

Aspect 41: The method of any of Aspects 28-40, wherein the first operating mode is an active mode and the second operating mode is an energy saving mode.

Aspect 42: An apparatus for wireless communication at a device, comprising a processor; memory coupled with the processor; and instructions stored in the memory and executable by the processor to cause the apparatus to perform the method of one or more of Aspects 1-17.

Aspect 43: A device for wireless communication, comprising a memory and one or more processors coupled to the memory, the one or more processors configured to perform the method of one or more of Aspects 1-17.

Aspect 44: An apparatus for wireless communication, comprising at least one means for performing the method of one or more of Aspects 1-17.

Aspect 45: A non-transitory computer-readable medium storing code for wireless communication, the code comprising instructions executable by a processor to perform the method of one or more of Aspects 1-17.

Aspect 46: A non-transitory computer-readable medium storing a set of instructions for wireless communication, the set of instructions comprising one or more instructions that, when executed by one or more processors of a device, cause the device to perform the method of one or more of Aspects 1-17.

Aspect 47: An apparatus for wireless communication at a device, comprising a processor; memory coupled with the processor; and instructions stored in the memory and executable by the processor to cause the apparatus to perform the method of one or more of Aspects 18-27.

Aspect 48: A device for wireless communication, comprising a memory and one or more processors coupled to the memory, the one or more processors configured to perform the method of one or more of Aspects 18-27.

Aspect 49: An apparatus for wireless communication, comprising at least one means for performing the method of one or more of Aspects 18-27.

Aspect 50: A non-transitory computer-readable medium storing code for wireless communication, the code comprising instructions executable by a processor to perform the method of one or more of Aspects 18-27.

Aspect 51: A non-transitory computer-readable medium storing a set of instructions for wireless communication, the set of instructions comprising one or more instructions that, when executed by one or more processors of a device, cause the device to perform the method of one or more of Aspects 18-27.

Aspect 52: An apparatus for wireless communication at a device, comprising a processor; memory coupled with the processor; and instructions stored in the memory and executable by the processor to cause the apparatus to perform the method of one or more of Aspects 28-41.

Aspect 53: A device for wireless communication, comprising a memory and one or more processors coupled to the memory, the one or more processors configured to perform the method of one or more of Aspects 28-41.

Aspect 54: An apparatus for wireless communication, comprising at least one means for performing the method of one or more of Aspects 28-41.

Aspect 55: A non-transitory computer-readable medium storing code for wireless communication, the code comprising instructions executable by a processor to perform the method of one or more of Aspects 28-41.

Aspect 56: A non-transitory computer-readable medium storing a set of instructions for wireless communication, the set of instructions comprising one or more instructions that, when executed by one or more processors of a device, cause the device to perform the method of one or more of Aspects 28-41.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A user equipment (UE) for wireless communication, comprising:
at least one memory; and
at least one processor communicatively coupled with the at least one memory, the at least one processor configured to cause the UE to:
monitor a control channel of a first cell associated with a first network node based at least in part on the first cell operating in an active mode;
receive, from the first cell, a paging signal indicating that the UE is to establish a connection with a second cell, associated with a second network node, operating in an energy saving mode; and
transmit, to the second network node and based at least in part on the paging signal, a first signal associated with establishing the connection with the second cell.

2. The UE of claim 1, wherein the at least one processor is further configured to cause the UE to:
receive, from the second cell, one or more discovery signals, wherein one or more measurements associated with the second cell are based at least in part on the one or more discovery signals.

3. The UE of claim 1, wherein the at least one processor is further configured to cause the UE to:
transmit, to the first cell, an indication of measurements associated with one or more cells operating in the energy saving mode, the measurements including one or more measurements associated with the second cell.

4. The UE of claim 3, wherein the indication of the measurements includes an indication of at least one of:
respective identifiers of discovery signals associated with the measurements, or
respective time-frequency resources associated with the measurements.

5. The UE of claim 3, wherein the at least one processor is further configured to cause the UE to:
transmit, to the first cell, an indication that the UE is storing the measurements associated with the one or more cells operating in the energy saving mode; and
receive, from the first cell, a request to transmit the indication of the measurements, wherein, to cause the UE to transmit the indication of the measurements, the at least one processor is configured to cause the UE to transmit the indication of the measurements based at least in part on the request.

6. The UE of claim 3, wherein the at least one processor is further configured to cause the UE to:
receive, from the first cell, a request for measurements associated with cells operating in the energy saving mode, wherein, to cause the UE to transmit the indication of the measurements, the at least one processor is configured to cause the UE to transmit the indication of the measurements based at least in part on the request.

7. The UE of claim 3, wherein the at least one processor is further configured to cause the UE to:
receive, from the first cell, an indication of uplink resources based at least in part on establishing a connection with the first cell, wherein, to cause the UE to transmit the indication of the measurements, the at least one processor is configured to cause the UE to transmit the indication of the measurements using the uplink resources.

8. The UE of claim 1, wherein the at least one processor is further configured to cause the UE to:
refrain from selecting the second cell or from monitoring a control channel associated with the second cell prior to transmitting the first signal based at least in part on the second cell being barred for camping.

9. The UE of claim 8, wherein, to cause the UE to transmit the first signal, the at least one processor is configured to cause the UE to transmit the first signal to the second cell based at least in part on one or more measurements associated with the second cell.

10. The UE of claim 9, wherein, to cause the UE to transmit the first signal, the at least one processor is configured to cause the UE to transmit the first signal based at least in part on the one or more measurements satisfying a threshold, wherein the threshold is associated with at least one of: a value, or a differential value from a measurement value associated with the first cell.

11. A first network node for wireless communication, comprising:
at least one memory; and
at least one processor communicatively coupled with the at least one memory, the at least one processor configured to cause the first network node to:
receive an indication for a first cell to monitor one or more time-frequency resources that are associated with a channel access procedure that is associated with a user equipment (UE), the first cell operating in an energy saving mode, and the channel access procedure being associated with the UE and a second cell that is operating in an active mode;
receive, based at least in part on the one or more time-frequency resources being monitored, one or more signals associated with the UE;
perform an action associated with the energy saving mode based at least in part on one or more measurements associated with the one or more signals; and
receive, based at least in part on the action and a paging signal indicating that the UE is to establish a connection with the first cell, a signal associated with establishing the connection with the first cell.

12. The first network node of claim 11, wherein, to cause the first network node to perform the action, the at least one processor is configured to cause the first network node to:
transmit a measurement report indicating the one or more measurements associated with the one or more signals.

13. The first network node of claim 11, wherein, to cause the first network node to perform the action, the at least one processor is configured to cause the first network node to:
modify a state of the energy saving mode based at least in part on the one or more measurements satisfying a threshold.

14. The first network node of claim 13, wherein, to cause the first network node to modify the state of the energy saving mode, the at least one processor is configured to cause the first network node to:
initiate transmission of synchronization signal blocks (SSBs), or
modify a periodicity at which SSBs are transmitted.

15. The first network node of claim 11, wherein the at least one processor is further configured to cause the first network node to:

transition the first cell to an active mode based at least in part on the signal associated with establishing the connection with the first cell.

16. A method of wireless communication performed by a user equipment (UE), comprising:
monitoring a control channel of a first cell associated with a first network node based at least in part on the first cell operating in an active mode;
receiving, from the first cell, a paging signal indicating that the UE is to establish a connection with a second cell, associated with a second network node, operating in an energy saving mode; and
transmitting, to the second network node and based at least in part on receiving the paging signal, a first signal associated with establishing the connection with the second cell.

17. The method of claim 16, further comprising:
receiving, from the second cell, one or more discovery signals, wherein one or more measurements associated with the second cell are based at least in part on the one or more discovery signals.

18. The method of claim 16, further comprising:
transmitting, to the first cell, an indication of measurements associated with one or more cells operating in the energy saving mode, the measurements including one or more measurements associated with the second cell.

19. The method of claim 18, wherein the indication of the measurements includes an indication of at least one of:
respective identifiers of discovery signals associated with the measurements, or
respective time-frequency resources associated with the measurements.

20. The method of claim 18, further comprising:
transmitting, to the first cell, an indication that the UE is storing the measurements associated with the one or more cells operating in the energy saving mode; and
receiving, from the first cell, a request to transmit the indication of the measurements, wherein transmitting the indication of the measurements is based at least in part on receiving the request.

21. The method of claim 18, further comprising:
receiving, from the first cell, a request for measurements associated with cells operating in the energy saving mode, wherein transmitting the indication of the measurements is based at least in part on receiving the request.

22. The method of claim 18, further comprising:
receiving, from the first cell, an indication of uplink resources based at least in part on establishing a connection with the first cell, wherein the indication of the measurements is transmitted using the uplink resources.

23. The method of claim 16, further comprising:
refraining from selecting the second cell or from monitoring a control channel associated with the second cell prior to transmitting the first signal based at least in part on the second cell being barred for camping.

24. The method of claim 23, wherein transmitting the first signal comprises transmitting the first signal to the second cell based at least in part on one or more measurements associated with the second cell.

25. The method of claim 24, wherein transmitting the first signal is based at least in part on the one or more measurements satisfying a threshold, wherein the threshold is associated with at least one of: a value, or a differential value from a measurement value associated with the first cell.

26. A method of wireless communication performed by a first network node, comprising:
receiving an indication for a first cell to monitor one or more time-frequency resources that are associated with a channel access procedure that is associated with a user equipment (UE), the first cell operating in an energy saving mode, and the channel access procedure being associated with the UE and a second cell that is operating in an active mode;
receiving, based at least in part on monitoring the one or more time-frequency resources, one or more signals associated with the UE;
performing an action associated with the energy saving mode based at least in part on one or more measurements associated with the one or more signals; and
receiving, based at least in part on the action and a paging signal indicating that the UE is to establish a connection with the first cell, a signal associated with establishing the connection with the first cell.

27. The method of claim 26, wherein performing the action comprises:
transmitting a measurement report indicating the one or more measurements associated with the one or more signals.

28. The method of claim 26, wherein performing the action comprises:
modifying a state of the energy saving mode based at least in part on the one or more measurements satisfying a threshold.

29. The method of claim 26, wherein the one or more time-frequency resources are associated with a random access channel (RACH) configuration that is associated with the second cell.

30. The method of claim 26, further comprising:
transitioning the first cell to an active mode based at least in part on receiving the signal associated with establishing the connection with the first cell.

* * * * *